United States Patent
Kim et al.

(10) Patent No.: US 11,184,897 B2
(45) Date of Patent: Nov. 23, 2021

(54) METHOD AND APPARATUS FOR REQUESTING SYSTEM INFORMATION BY USING PREAMBLE IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/618,967

(22) PCT Filed: Jun. 5, 2018

(86) PCT No.: PCT/KR2018/006393
§ 371 (c)(1),
(2) Date: Dec. 3, 2019

(87) PCT Pub. No.: WO2018/226010
PCT Pub. Date: Dec. 13, 2018

(65) Prior Publication Data
US 2020/0280991 A1    Sep. 3, 2020

(30) Foreign Application Priority Data
Jun. 5, 2017   (KR) .................. 10-2017-0069594

(51) Int. Cl.
*H04W 72/04* (2009.01)
*H04W 76/27* (2018.01)
(Continued)

(52) U.S. Cl.
CPC ... *H04W 72/0493* (2013.01); *H04W 72/1273* (2013.01); *H04W 74/0833* (2013.01); *H04W 76/27* (2018.02)

(58) Field of Classification Search
CPC ............. H04W 72/0493; H04W 76/27; H04W 72/1273; H04W 74/0833
See application file for complete search history.

(56) References Cited

U.S. PATENT DOCUMENTS

2011/0013531 A1   1/2011   Liu
2012/0165058 A1   6/2012   Hwang et al.
(Continued)

FOREIGN PATENT DOCUMENTS

CN   102474800 A   5/2012
CN   105557056 A   5/2016
(Continued)

OTHER PUBLICATIONS

3rd Generation Partnership Project; Technical Specification Group Radio Access Network; Study on New Radio Access Technology; Radio Interface Protocol Aspects (Release 14), 3GPP Standard; Technical Report; 3GPP TR 38.804 , 3rd Generation Partnership Project (3GPP), Mobile Competence Centre 650, Route Des Lucioles; F-06921 Sophia-Antipolis Cedex France, vo 1. RAN WG2 , No. V14.0.0 , Mar. 24, 2017 (Mar. 24, 2017), XP051297619, [retrieved on Mar. 24, 2018].

(Continued)

*Primary Examiner* — Ajay Cattungal
(74) *Attorney, Agent, or Firm* — Jefferson IP Law, LLP

(57) ABSTRACT

The present disclosure relates to a communication scheme for convergence of an IoT technology and a 5G communication system for supporting a higher data transmission rate beyond a 4G system, and a system therefor. The present disclosure may be applied to an intelligent service (for (Continued)

example, a smart home, a smart building, a smart city, a smart car or connected car, healthcare, digital education, retail business, a security and security related service, or the like) on the basis of a 5G communication technology and an IoT related technology. The present invention provides a method and an apparatus for efficiently transmitting or receiving system information by using a preamble in a next generation mobile communication system.

16 Claims, 32 Drawing Sheets

(51) Int. Cl.
*H04W 74/08* (2009.01)
*H04W 72/12* (2009.01)

(56) References Cited

U.S. PATENT DOCUMENTS

| | | |
|---|---|---|
| 2013/0114658 A1 | 5/2013 | Davydov et al. |
| 2013/0155895 A1 | 6/2013 | Kim et al. |
| 2014/0112184 A1 | 4/2014 | Chai |
| 2015/0029905 A1 | 1/2015 | Yi et al. |
| 2016/0219626 A1 | 7/2016 | Martin |
| 2016/0234759 A1* | 8/2016 | Kubota ................ H04W 48/10 |
| 2016/0301486 A1 | 10/2016 | Joey |
| 2016/0316405 A1 | 10/2016 | Balan et al. |
| 2017/0111886 A1 | 4/2017 | Kim et al. |
| 2017/0265165 A1 | 9/2017 | Li et al. |
| 2017/0311290 A1* | 10/2017 | Adjakple ................ H04W 4/06 |
| 2018/0041936 A1 | 2/2018 | Kim et al. |
| 2018/0049107 A1 | 2/2018 | Johansson et al. |
| 2018/0199266 A1 | 7/2018 | Pantelidou |
| 2018/0324679 A1* | 11/2018 | Basu Mallick ....... H04W 48/10 |
| 2019/0174554 A1* | 6/2019 | Deenoo ............... H04W 56/001 |
| 2020/0022040 A1* | 1/2020 | Chen .................. H04W 56/001 |
| 2020/0163046 A1* | 5/2020 | Chen .................... H04W 68/005 |
| 2020/0236613 A1* | 7/2020 | Frenger ................ H04B 7/0617 |
| 2020/0296765 A1* | 9/2020 | Kim .................. H04W 74/0833 |

FOREIGN PATENT DOCUMENTS

| | | |
|---|---|---|
| CN | 106792998 A | 5/2017 |
| KR | 10-2012-0016331 A | 2/2012 |
| KR | 10-2015-0055115 A | 5/2015 |
| KR | 10-2016-0082693 A | 7/2016 |
| KR | 10-2018-0015589 A | 2/2018 |
| WO | 2017/070888 A1 | 5/2017 |
| WO | 2018/028670 A1 | 2/2018 |
| WO | 2018/203633 A1 | 11/2018 |

OTHER PUBLICATIONS

European Search Report dated Jan. 17, 2020, issued in European Application No. 18813460.5-1212.
European Office Action dated Apr. 29, 2021, issued in a counterpart European Application No. 18 813 460.5-1212.
Chinese Office Action dated Jun. 15, 2021, issued in a counterpart Chinese Application No. 201880037294.1.
Samsung; On Demand SI Request Transmission Mechanism; 3GPP TSG-RAN WG2 Meeting # 97 R2-1700817; Feb. 1, 2017, Athens, Greece.
CATT; On-demand system information delivery mechanism; 3GPP TSG-RAN WG2 Meeting #96 R2-167960; Nov. 4, 2016, Reno, Nevada, USA.
Samsung; System Information Signalling Design in NR; 3GPP TSG-RAN WG2 Meeting #95; R2-164693; Aug. 12, 2016, Gothenburg, Sweden.
Huawei et al., R2-1702619, Msg1 vs Msg 3 for On-Demand Request, 3GPP TSG RAN WG2 #97bis.
Korean Office Action dated Sep. 16, 2021, issued in Korean Application No. 10-2017-0069594.

* cited by examiner

EACH PREAMBLE FOR SI REQUEST CORRESPONDS TO ONE OR MORE SI MESSAGES (SIBS) TO BE REQUESTED p (x-n+1): request all Other SIs or all SIBx, where x>2
p (x-n+2): request the first SI message or SIBx
p (x-n+3): request the second SI message or SIB(x+1)
...

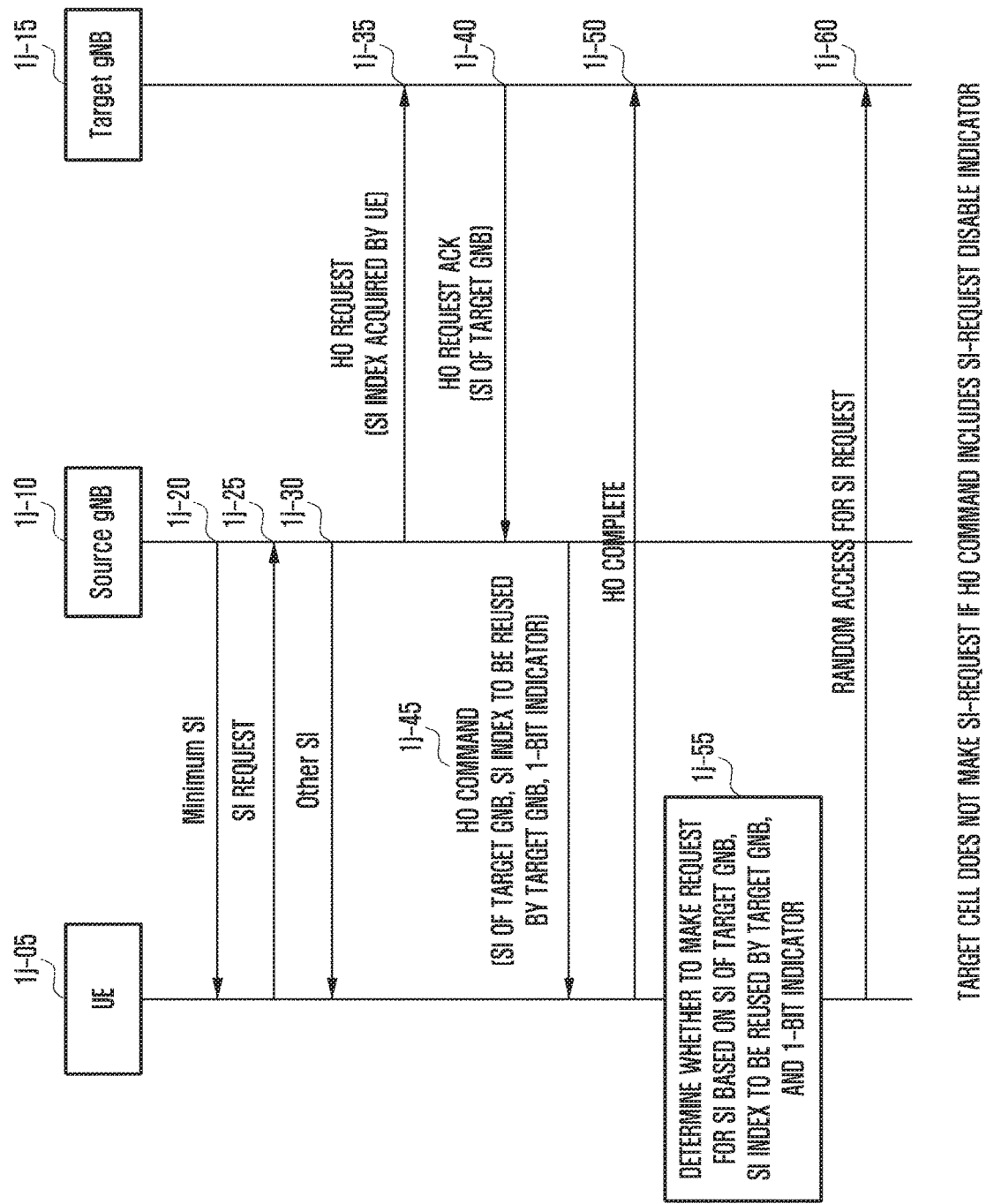

b0: request all Other SIs or all SIBx, where x > 2
b1: request the first SI message or SIBx
b2: request the second SI message or SIB(x+1)
...

- HAS VARIOUS SIZES BASED ON NUMBER OF SIS OR SIBS TO BE REQUESTED

- SAME SIZE AS C-RNTI MAC CE
- RANDOM VALUE OR VALUE FROM UE ID

Option 1:
IF UE ID MACE CE AND SI-REQUEST MAC CE ARE X BITS, THIS FIELD INCLUDES BOTH OF THEM
IF UE ID MACE CE AND SI-REQUEST MAC CE ARE LONGER THAN X BITS, THEY ARE INCLUDED IN FIRST X BITS OF THIS FIELD Option 2:
THIS FIELD CONTAINS UE ID MAC CE
IN THAT OPTION, THE CONTENT OF UE CONTENTION RESOLUTION IDENTITY IS SAME AS UE ID MAC CE

METHOD AND APPARATUS FOR REQUESTING SYSTEM INFORMATION BY USING PREAMBLE IN NEXT GENERATION MOBILE COMMUNICATION SYSTEM

TECHNICAL FIELD

The present disclosure relates to a method and an apparatus for operations of a UE and an eNB to request system information in a next-generation mobile communication system.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an mmWave band (for example, 60 GHz band) is being considered.

In the 5G communication system, technologies such as beamforming, massive MIMO, Full-Dimensional MIMO (FD-MIMO), array antenna, analog beamforming, and large-scale antenna are being discussed as means to mitigate a propagation path loss in the mmWave band and increase a propagation transmission distance. Further, the 5G communication system has developed technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation in order to improve the system network.

In addition, the 5G system has developed advanced coding modulation (ACM) schemes, such as hybrid FSK and QAM modulation (FQAM) and sliding window superposition coding (SWSC), and advanced access technologies, such as filter bank multi carrier (FBMC), non-orthogonal multiple access (NOMA), and sparse code multiple access (SCMA).

The Internet has evolved from a human-oriented connection network in which humans generate and consume information to an Internet-of-Things (IoT) network in which information is exchanged between distributed components such as objects and the like. Internet-of-Everything (IoE) technology, in which big-data processing technology is combined with IoT technology through a connection with a cloud server or the like, has emerged. In order to implement IoT, technical factors such as a sensing technique, wired/wireless communication, network infrastructure, service-interface technology, and secure technology are required, and research on technologies such as a sensor network, machine-to-machine (M2M) communication, machine-type communication (MTC), and the like for connection between objects has recently been conducted.

In an IoT environment, through collection and analysis of data generated in connected objects, an intelligent Internet Technology (IT) service that creates new value in peoples' lives may be provided. The IoT may be applied to fields such as those of a smart home, a smart building, a smart city, a smart car, a connected car, a smart grid, health care, a smart home appliance, or high-tech medical services through the convergence of the conventional information technology (IT) and various industries.

Accordingly, various attempts to apply the 5G communication to the IoT network are being made. For example, technologies such as a sensor network, machine-to-machine (M2M), and machine-type communication (MTC) are implemented using beamforming, MIMO, and array-antenna schemes. The application of a cloud RAN as big-data processing technology may be an example of convergence of 5G technology and IoT technology.

With the development of the next-generation mobile communication system, a new approach to and research on preamble transmission is spotlighted. Particularly, a new communication system requires improvement of a method and an apparatus for smoothly performing a process of transmitting a preamble to make a request for system information.

DISCLOSURE OF INVENTION

Technical Problem

An aspect of the present disclosure is to propose a preamble making a request for system information in a wireless communication system and propose a series of processes for transmitting and receiving system information through the proposed preamble.

Another aspect of the present disclosure is to propose a message making a request for system information in a wireless communication system and propose a series of processes for transmitting and receiving system information through the proposed message.

Still another aspect of the present disclosure is to propose a method by which, when measuring a cell and reporting the result thereof, a UE transmitting and receiving data simultaneously using a plurality of radio access technologies (RATs) in a wireless communication system provides to make an eNB accurately add/release a cell and accurately determine handover.

Solution to Problem

In accordance with an aspect of the present disclosure, a method of an eNB in a wireless communication system is provided. The method includes: transmitting a configuration message including information on a plurality of frequencies which are measurement objects and threshold information of a signal intensity (reference signal received power (RSRP)) related to measurement of the plurality of frequencies to a UE; and receiving a measurement report message based on the configuration message from the UE, wherein the configuration message further includes indication information indicating the measurement for at least one of the plurality of frequencies regardless of the threshold information.

In accordance with another aspect of the present disclosure, a method of a UE in a wireless communication system is provided. The method includes: receiving a configuration message including information on a plurality of frequencies which are measurement objects and threshold information of reference signal received power (RSRP) related to measurement for the plurality of frequencies from an eNB; performing measurement, based on the configuration message; and transmitting a measurement report message including a result of the performed measurement, based on the configuration message, to the eNB, wherein the configuration message further includes indication information indicating the measurement for at least one of the plurality of frequencies regardless of the threshold information.

In accordance with another aspect of the present disclosure, an eNB in a wireless communication system is provided. The eNB includes: a transceiver; and a controller configured to transmit a configuration message including information on a plurality of frequencies which are measurement objects and threshold information of a signal intensity (reference signal received power (RSRP)) related to measurement of the plurality of frequencies to a UE, perform measurement, based on the configuration message, and control the transceiver to receive a measurement report message based on the configuration message from the UE, wherein the configuration message further includes indication information indicating the measurement for at least one of the plurality of frequencies regardless of the threshold information.

In accordance with another aspect of the present disclosure, a UE in a wireless communication system is provided. The UE includes a transceiver, and a controller configured to control the transceiver to receive a configuration message including information on a plurality of frequencies which are measurement objects and threshold information of reference signal received power (RSRP) related to measurement for the plurality of frequencies from an eNB, perform measurement, based on the configuration message, and control the transceiver to transmit a measurement report message including a result of the performed measurement, based on the configuration message, to the eNB, wherein the configuration message further includes indication information indicating the measurement for at least one of the plurality of frequencies regardless of the threshold information.

In accordance with another aspect of the present disclosure, a method of a UE in a wireless communication system is provided. The method includes: receiving first system information from an eNB; making a request for second system information other than the first system information through a selected message, based on the first system information; and when the second system information is not received in response to the request, making a request for the second system information again after a backoff time determined by a preset backoff indicator, wherein the backoff indicator is applied differently according to the selected message.

In accordance with another aspect of the present disclosure, a method of an eNB in a wireless communication system is provided. The method includes: transmitting first system information to a UE; receiving a request for second system information other than the first system information from the UE through a selected message, based on the first system information; and receiving, from the UE, a request for the second system information again after a backoff time determined by a preset backoff indicator, wherein the backoff indicator is applied differently according to the selected message.

In accordance with another aspect of the present disclosure, a UE in a wireless communication system is provided. The UE includes: a transceiver; and a controller configured to receive first system information from an eNB, make a request for second system information other than the first system information through a selected message, based on the first system information; and when the second system information is not received in response to the request, make a request for the second system information again after a backoff time determined by a preset backoff indicator, wherein the backoff indicator is applied differently according to the selected message.

In accordance with another aspect of the present disclosure, an eNB in a wireless communication system is provided. The eNB includes: a transceiver; and a controller configured to transmit first system information to a UE, receive a request for second system information other than the first system information from the UE through a selected message, based on the first system information, and receive, from the UE, a request for the second system information again after a backoff time determined by a preset backoff indicator, wherein the backoff indicator is applied differently according to the selected message.

Advantageous Effects of Invention

According to an embodiment of the present disclosure, it is possible to improve a message transmission/reception process between the UE and the eNB and thus smoothly and efficiently perform a system information transmission/reception process.

According to another embodiment of the present disclosure, the UE reduces power consumption required for measuring neighboring eNBs and measures and reports different types of eNBs in time, and thus the eNB may add the corresponding measured eNB to the UE or move the UE to the corresponding measured eNB, so that the UE can use the corresponding eNB in time.

BRIEF DESCRIPTION OF DRAWINGS

FIG. 1J illustrates a method of indicating system information of a target cell during a handover process according to the present disclosure;

BEST MODE FOR CARRYING OUT THE INVENTION

Figure 1A:
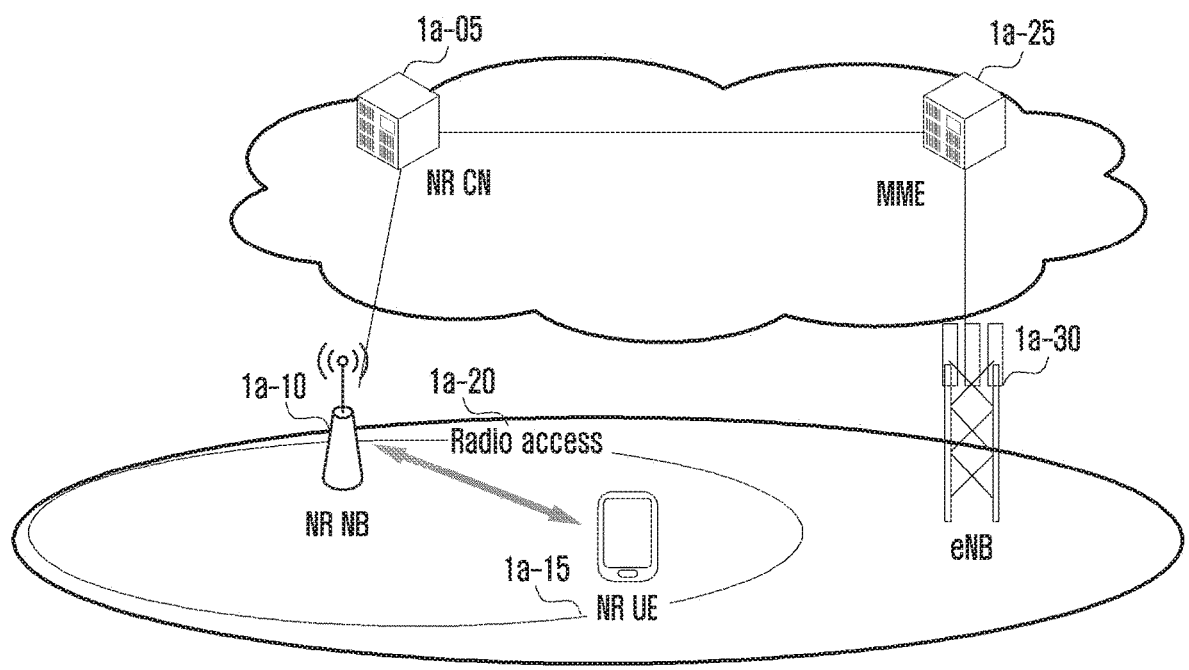
FIG. 1A illustrates the structure of a next-generation mobile communication system.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

First Embodiment

FIG. 1A illustrates the structure of a next-generation mobile communication system.

Referring to FIG. 1A, a radio access network of the next-generation mobile communication system includes a next-generation base station (hereinafter, referred to as NR NB (new radio node B)) 1a-10 and a new radio core network (NR CN) 1a-05 as illustrated in FIG. 1A. A user terminal (hereinafter, referred to as an NR UE (New Radio User Equipment) or a UE) 1a-15 accesses an external network through the NR NB 1a-10 and the NR CN 1a-05.

In FIG. 1A, the NR NB 1a-10 corresponds to an evolved Node B (eNB) in a conventional LTE system. The NR NB may be connected to the NR UE 1a-15 through a radio channel and may provide better service compared to the conventional node B. Since all user traffic is served through a shared channel in the next-generation mobile communication system, a device for collecting and scheduling status information of buffer statuses, available transmission power statuses, and channel statuses of UEs is required, which corresponds to the NR NB 1a-10.

One NR NB generally controls a plurality of cells. The NR NB may have a bandwidth wider than the conventional maximum bandwidth in order to implement super-high-speed data transmission compared to conventional LTE and may apply orthogonal frequency division multiplexing (OFDM) through radio access technology, and may further apply beamforming technology. Further, a modulation scheme and an adaptive modulation and coding (hereinafter, referred to as an AMC) scheme of determining a channel coding rate are applied to the LTE system in correspondence to a channel status of the UE.

The NR CN 1a-05 performs a function of supporting mobility, configuring a bearer, and configuring quality of service (QoS). The NR CN is a device for performing a function of managing mobility of the UE and various control functions and is connected to a plurality of eNBs. Further, the next-generation mobile communication system may be linked to the conventional LTE system, and the NR CN is connected to an MME 1a-25 through a network interface. The MME is connected to an eNB 1a-30, which is the conventional eNB.

Figure 1B:
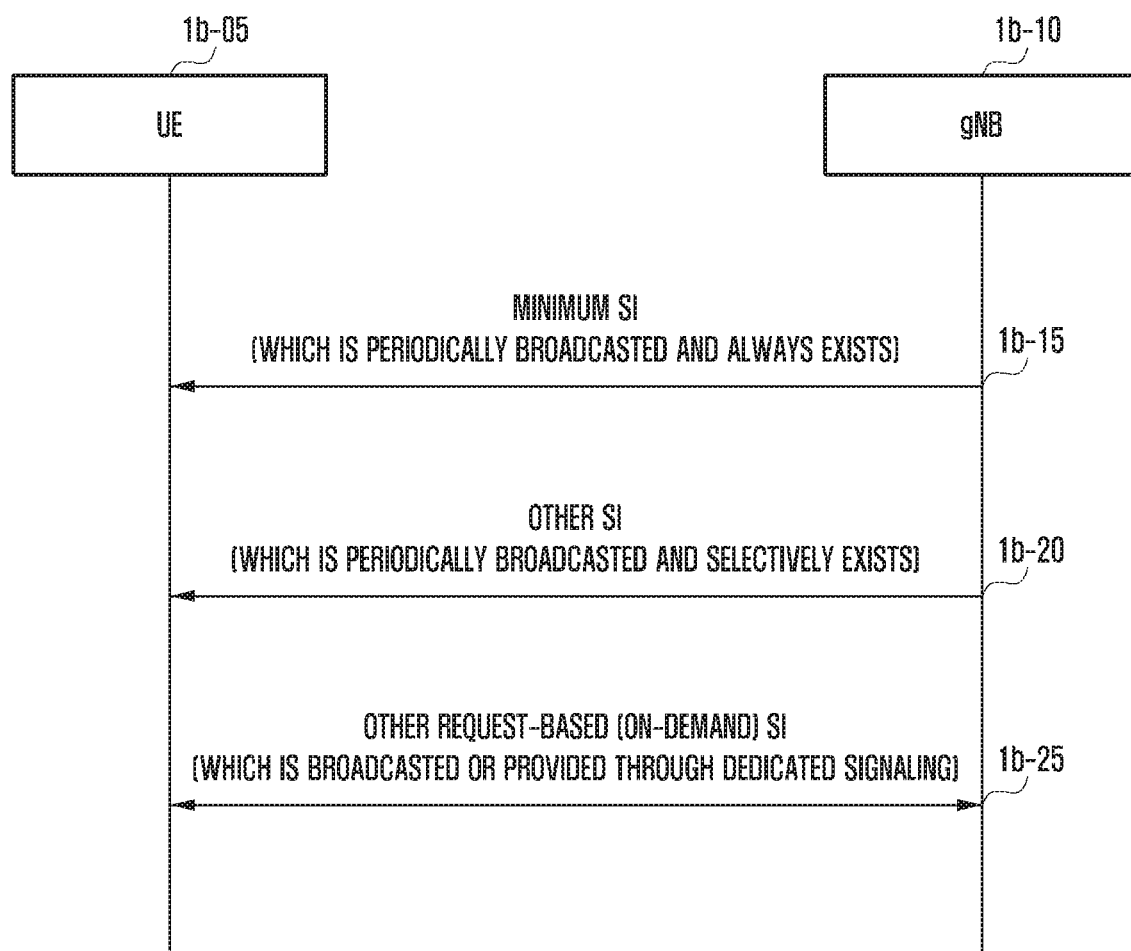
FIG. 1B illustrates a method of providing system information in the next-generation mobile communication system.

FIG. 1B illustrates a method of providing system information in the next-generation mobile communication system.

In the next-generation mobile communication system, system information broadcasted by a gNB 1b-10 is largely divided into minimum system information (SI) and other system information.

The minimum SI is periodically broadcasted as indicated by reference numeral 1b-15 and includes configuration information required for initial access and SI scheduling information required for receiving other SI, broadcasted periodically or in response to a request. Basically, the other SI includes all pieces of configuration information that are not included in the minimum SI.

The other SI is broadcasted periodically as indicated by reference numeral 1b-20 or in response to a request from the UE, or is provided to the UE through dedicated signaling, as indicated by reference numeral 1b-25. When the other SI is received through a UE request, the UE is required to identify whether the other SI is valid in the cell or is currently being broadcasted (by a request from another UE) before the request. The identification can be performed through particular information provided by the minimum SI.

An idle-mode (RRC_IDLE) UE or an inactive-mode (RRC_INACTIVE) UE may make a request for other SI without changing a current RRC state. A connected-mode (RRC_CONNECTED) UE may make a request for and receive other SI through dedicated RRC signaling. The other SI is broadcasted at a predetermined cycle for a predetermined period of time. Public warning system (PWS) information is classified and provided as other SI. Whether to broadcast the other SI or to provide the same to the UE through dedicated RRC signaling is implemented by the network.

Figure 1C:
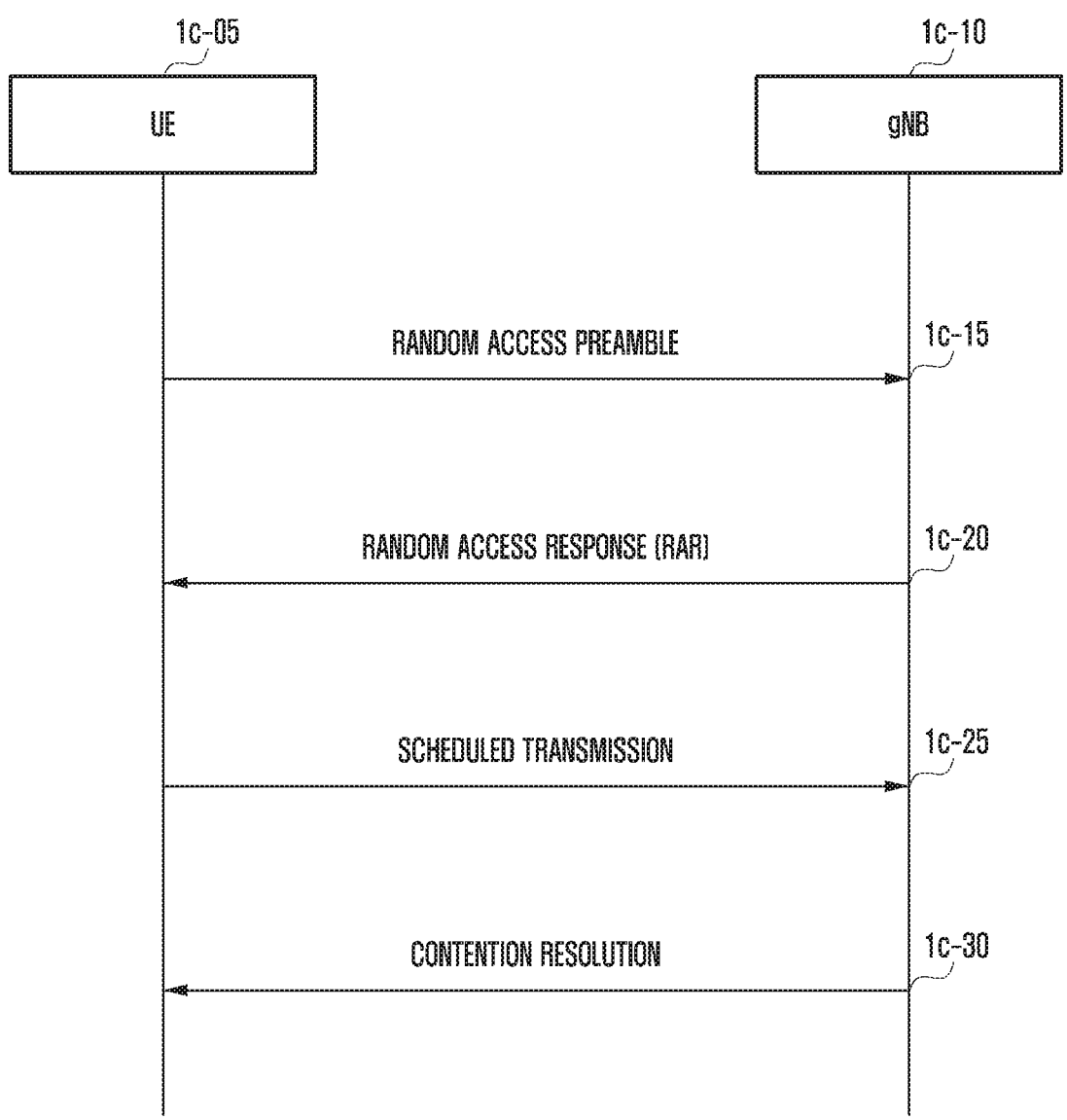
FIG. 1C illustrates a random access process in the conventional LTE system.

FIG. 1C illustrates a random access process in the conventional LTE system.

Random access is performed when uplink synchronization is performed or data is transmitted to the network. More specifically, random access may be performed when switching from an idle mode to a connected mode, when RRC reestablishment is performed, when handover is performed, and when uplink/downlink data transmission starts. Upon receiving a dedicated preamble from a gNB 1c-10, a UE 1c-05 applies and transmits the preamble. Otherwise, the UE selects one of two preamble groups and selects the preamble belonging to the selected group. The groups are referred to as group A and group B. If a channel quality status is higher than a particular threshold value and the size of msg 3 is larger than a particular threshold value, the UE selects a preamble belonging to group B and, otherwise, selects a preamble belonging to group A.

The preamble is transmitted in an $n^{th}$ subframe, as indicated by reference numeral 1c-15. When the preamble is transmitted in the $n^{th}$ subframe, a random access response (RAR) window starts from an $n+3^{th}$ subframe, and it is monitored whether the RAR is transmitted within the window time interval as indicated by reference numeral 1c-20. Scheduling information of the RAR is indicated by an RA-RATI of a PDCCH. The RA-RNTI is induced using the location of radio resources on time and frequency axes used for transmitting the preamble.

The RAR includes a timing advance command, a UL grant, and a temporary C-RNTI. If the RAR is successfully received in the RAR window, msg 3 is transmitted using information of the UL grant included in the RAR, as indicated by reference numeral 1c-25. Msg 3 includes different pieces of information depending on the purpose of the random access. [Table 1] below is an example of information carried on msg 3.

TABLE 1

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicated preamble) | BSR, PHR , (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |

TABLE 1-continued

| CASE | Message 3 Contents |
| --- | --- |
| PDCCH order (dedicated preamble) | BSR, PHR, (part of) DCCH/DTCH SDU |

If the RAR is received in an $n^{th}$ subframe, msg 3 is transmitted in an $n+6^{th}$ subframe. A hybrid auto retransmission request (HARQ) is applied to msg 3 and thereafter. After msg 3 transmission, the UE drives a particular timer and monitors a contention resolution (CR) message before the timer expires, as indicated by reference numeral 1c-30. The CR message includes an RRC connection setup message or an RRC connection reestablishment message depending on the purpose of the random access as well as a CR medium access control (MAC) control element (CE).

Figure 1D:
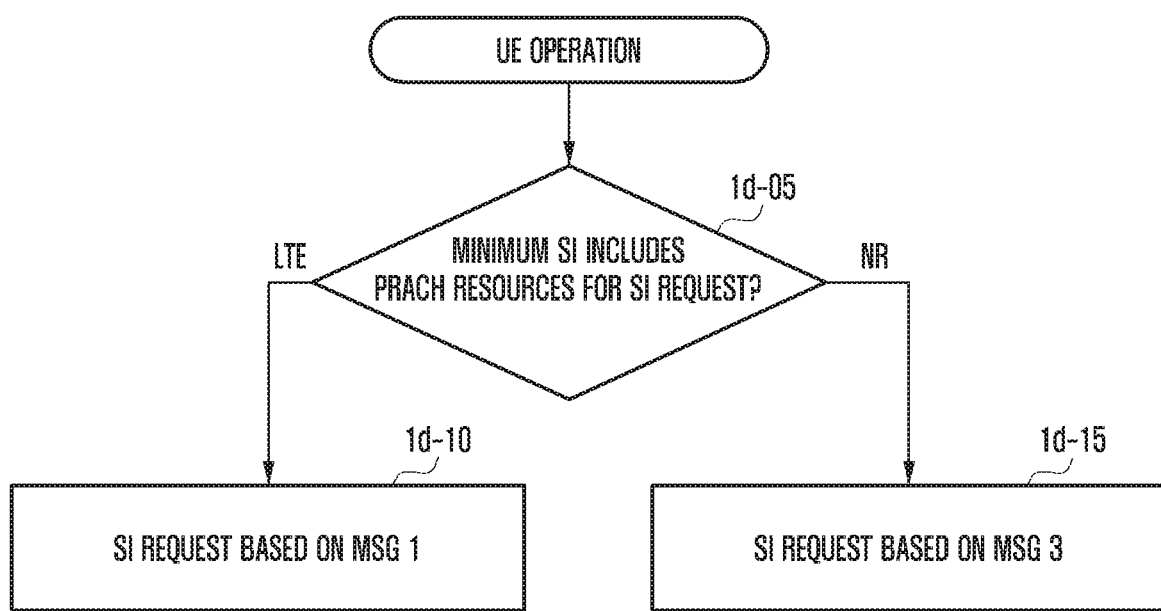
FIG. 1D illustrates a process of selecting an msg-1-based or an msg-3-based SI request method according to the present disclosure.

FIG. 1D illustrates a process of selecting an msg 1- or msg-3-based SI request method according to the present disclosure.

In order to make a request for system information other than the minimum SI, the UE uses random access.

The UE makes a request for system information, which the UE desires to receive, to the network through msg 1 (preamble) or msg 3. In step 1d-05, the UE determines whether PRACH resource information, which can be used for an SI request, is included in the periodically broadcasted minimum SI. The PRACH resource information may include preamble ID (or index) information used for the SI request (prach-ConfigIndex) and radio resource information for transmitting the preamble.

When the information is included, the UE may make a request for system information other than the minimum SI through msg 1, dedicated for the SI request, in step 1d-10. Otherwise, the UE makes a request for system information other than the minimum SI through msg 3 in step 1d-15. At this time, the UE transmits the preamble used for the general random access.

Figure 1E:
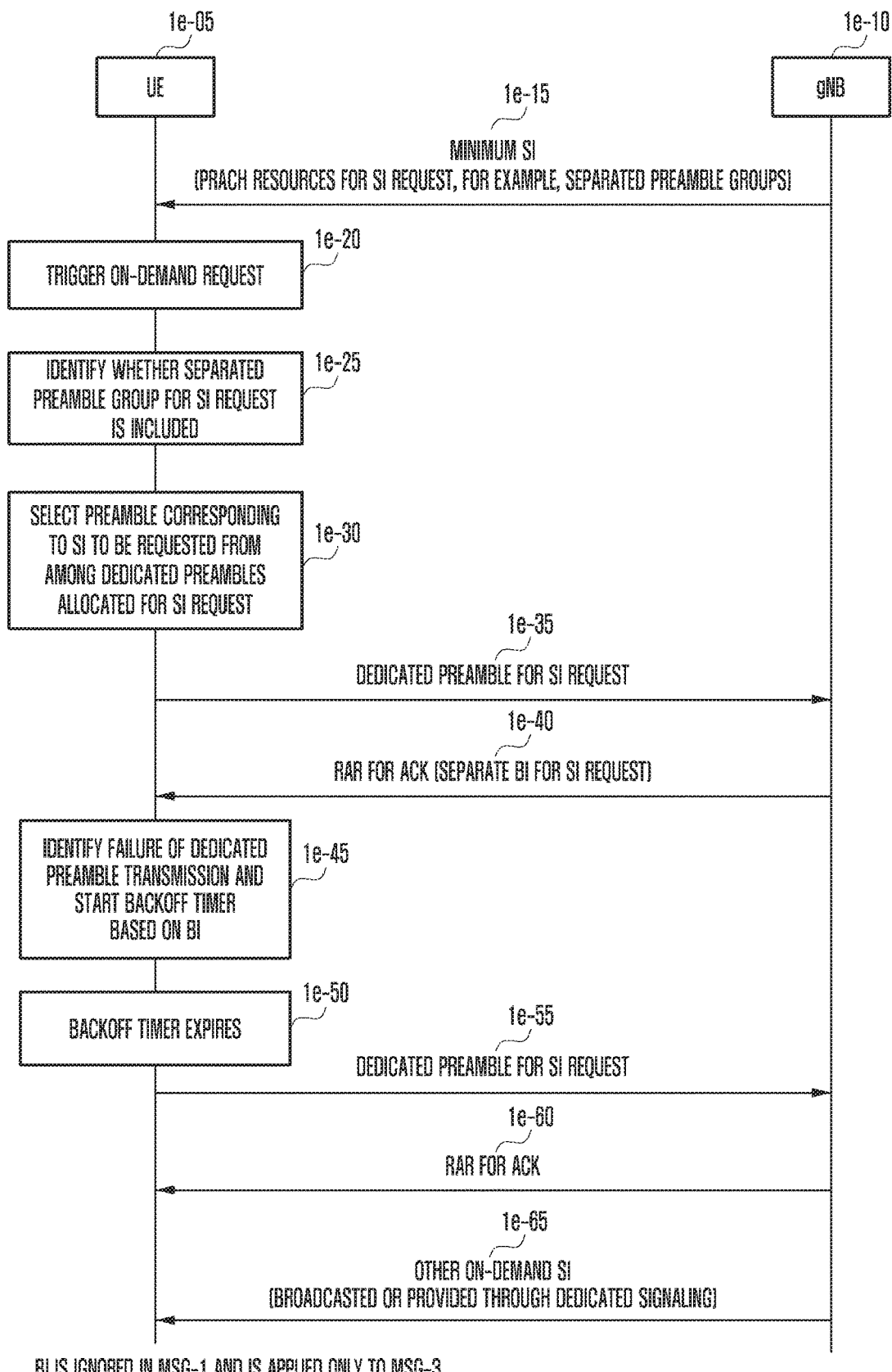
FIG. 1E illustrates an msg-1-based SI request process according to the present disclosure.

FIG. 1E illustrates an msg-1-based SI request process according to the present disclosure.

A UE 1e-05 receives minimum SI from a network 1e-10 in step 1e-15. The minimum SI may include an ID (index) of a dedicated preamble used for the SI request and radio resource information for transmitting the preamble.

The UE triggers a request for system information other than the minimum SI in step 1e-20. The UE determines whether dedicated preamble information for the SI request is included in the minimum SI in step 1e-25.

If the dedicated preamble can be transmitted, the UE selects a preamble corresponding to the requested system information in step 1e-30 and transmits the preamble to the network in step 1e-35. The network transmits the RAR to the UE for the purpose of acknowledgement (ACK) in step 1e-40. The RAR may include one or more subheaders including a backoff indicator (BI).

The backoff indicator is used for deriving a backoff time during which the UE should wait to perform a reattempt when the UE fails in random access. For example, one value may be selected from values between 0 and the backoff indicator through uniform distribution and the selected value may be configured to the backoff time. The subheader including the BI may be separately defined according to general random access, an msg-1-based SI request, or an msg-3-based SI request.

A subheader including an ID of the transmitted preamble may be included, and a MAC RAR corresponding to the subheader may include radio resource information through which the requested system information is broadcasted. The radio resource information may be included in the minimum SI. The radio resources may be generally used for unicast transmission, and if the UE makes a request for particular system information, may be used for broadcasting the system information.

If the RAR is not received within the SI window or if the subheader including the ID of the transmitted preamble is not included in the received RAR, it is considered that the preamble transmission has failed. Then, after waiting for the backoff time derived by the corresponding BI, the UE may transmit the preamble for the SI request again. The UE successfully receives the relevant RAR in step 1e-60 and then receives the requested system information in the configured radio resources in step 1e-65.

Figure 1F:
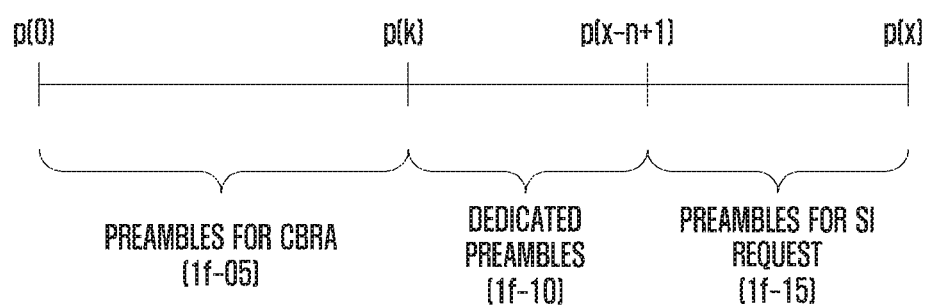
FIG. 1F illustrates a method of indicating an SI-request-dedicated preamble according to the present disclosure.

FIG. 1F illustrates a method of indicating an SI-request-dedicated preamble according to the present disclosure.

If $0^{th}$ to $x^{th}$ preambles can be used in the next-generation mobile communication system, $0^{th}$ to $k^{th}$ preambles may be classified as preambles 1f-05 or general random access, $k+1^{th}$ to $x-n+1^{th}$ preambles may be classified as dedicated preambles 1f-10, and $x-n^{th}$ to $x^{th}$ preambles may be classified as preambles 1f-15 for an SI request.

Each preamble for the SI request may be designated to be used for making a request for particular system information. For example, among the preambles for the SI request, the preamble corresponding to the lowest index value may be used for making a request for all pieces of system information except for minimum SI. The preamble corresponding to the next index value may be used for making a request for system information included in a first SI message. The preamble corresponding to the next index value may be used for making a request for system information included in a second SI message. Alternatively, the SI message may be replaced with a system information block (SIB).

Figure 1G:
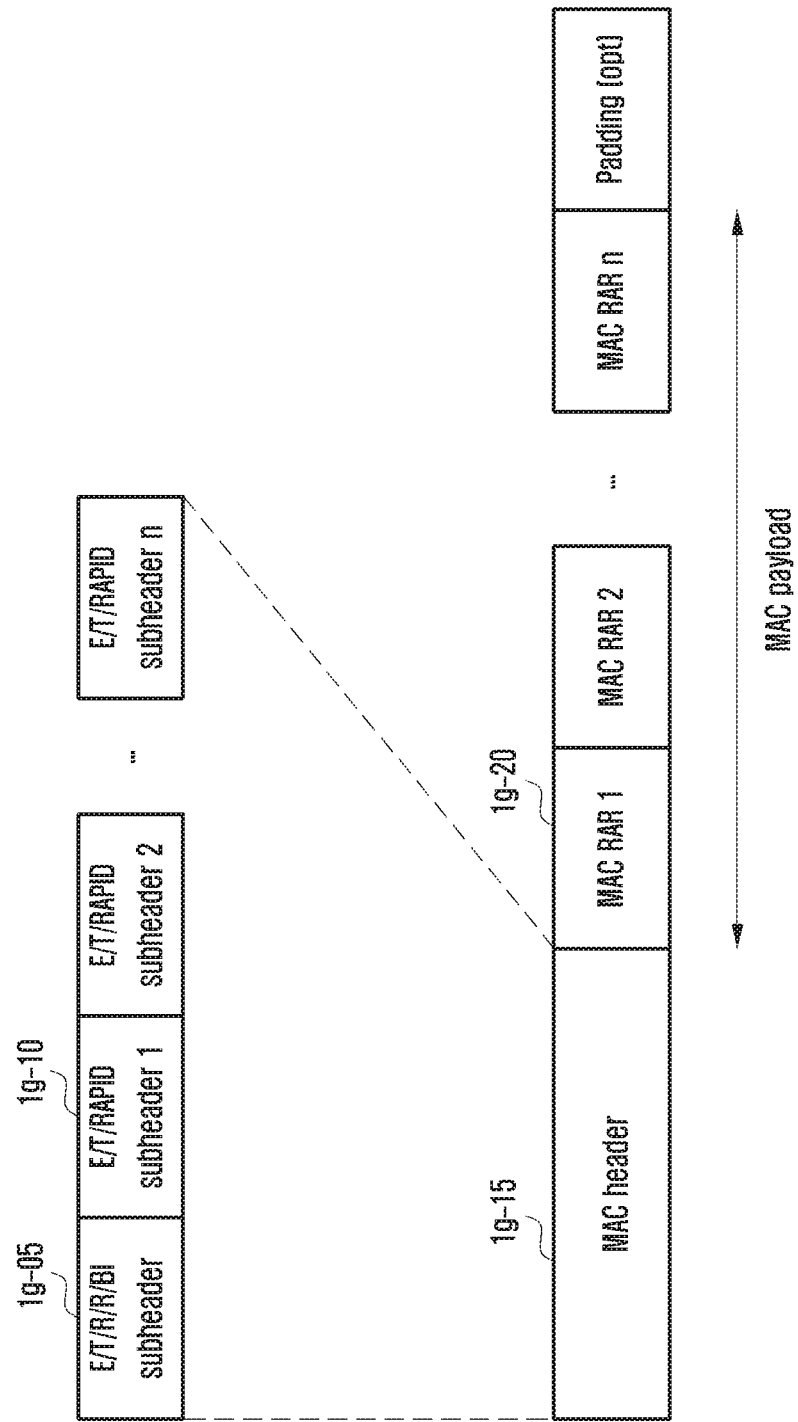
FIG. 1G illustrates the format of a random access response message according to the present disclosure.

FIG. 1G illustrates the format of a random access response message according to the present disclosure.

In the mobile communication system, the RAR includes one or more subheaders and one or more MAC RARs. In FIG. 1G, a MAC header 1g-15 including one or more subheaders is located at a front part of the RAR, but the subheaders may be located at another part of the RAR. Some of the subheaders may include a BI, as indicated by reference numeral 1g-05, and there may be no MAC RAR corresponding to the subheader. Further, in subheaders 1g-10 including preamble IDs, one MAC RAR 1g-20 corresponding thereto exists.

Figure 1H:
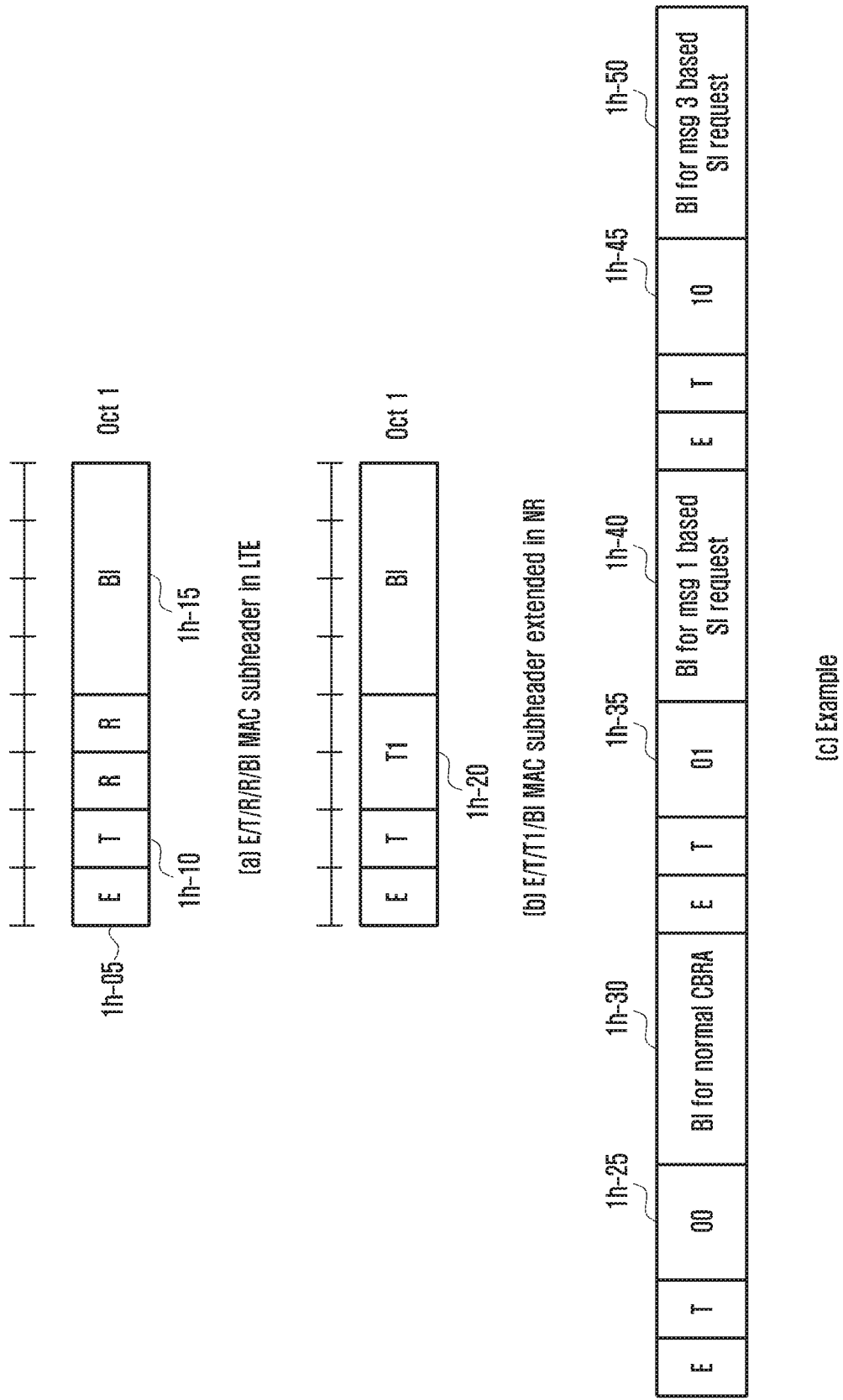
FIG. 1H illustrates a method of configuring subheaders including a backoff indicator according to the present disclosure.

FIG. 1H illustrates a method of configuring a subheader including a backoff indicator according to the present disclosure.

FIG. 1H(a) shows an E/T/R/R/BI MAC subheader in the conventional LTE technology. A field E 1h-05 indicates whether there is another MAC subheader. A field T 1h-10 is used for indicating whether the corresponding subheader is a subheader including a BI 1h-15 or a subheader including a random access preamble ID (RAPID). Field R is a reserved bit. A field BI is used for deriving the backoff time and has the size of a total of 4 bits.

The present disclosure provides BIs separately for general random access, random access for an msg-1-based SI request, and random access for an msg-3-based SI request. To this end, a field T1 1h-20 indicating which type of random access corresponds to the BI is added to the MAC subheader.

FIG. 1H(b) is an example of the MAC subheader proposed by the present disclosure. In the present embodiment, the conventional 2-bit field R is used as the field indicating which type of random access corresponds to the BI.

FIG. 1H(c) illustrates some of the MAC header in which MAC subheaders including 3 types of BIs are arranged in a row. For example, a BI 1h-30 included in the corresponding MAC subheader is applied to general random access if the field T1 is configured as 00 1h-25, a BI 1h-40 included in the corresponding MAC subheader is applied to random access for the msg-1-based SI request if the field T1 is configured as 01 1h-35, and a BI 1h-50 included in the corresponding MAC subheader is applied to random access for the msg-3-based SI request if the field T1 is configured as 10 1h-45. If the field T1 is 11, the BI included in the corresponding MAC subheader is applied to all types of random access.

In another embodiment, the BI may be applied only to the random access for the msg-3-based SI request without being applied to the random access for the msg-1-based SI request.

Figure 1I:
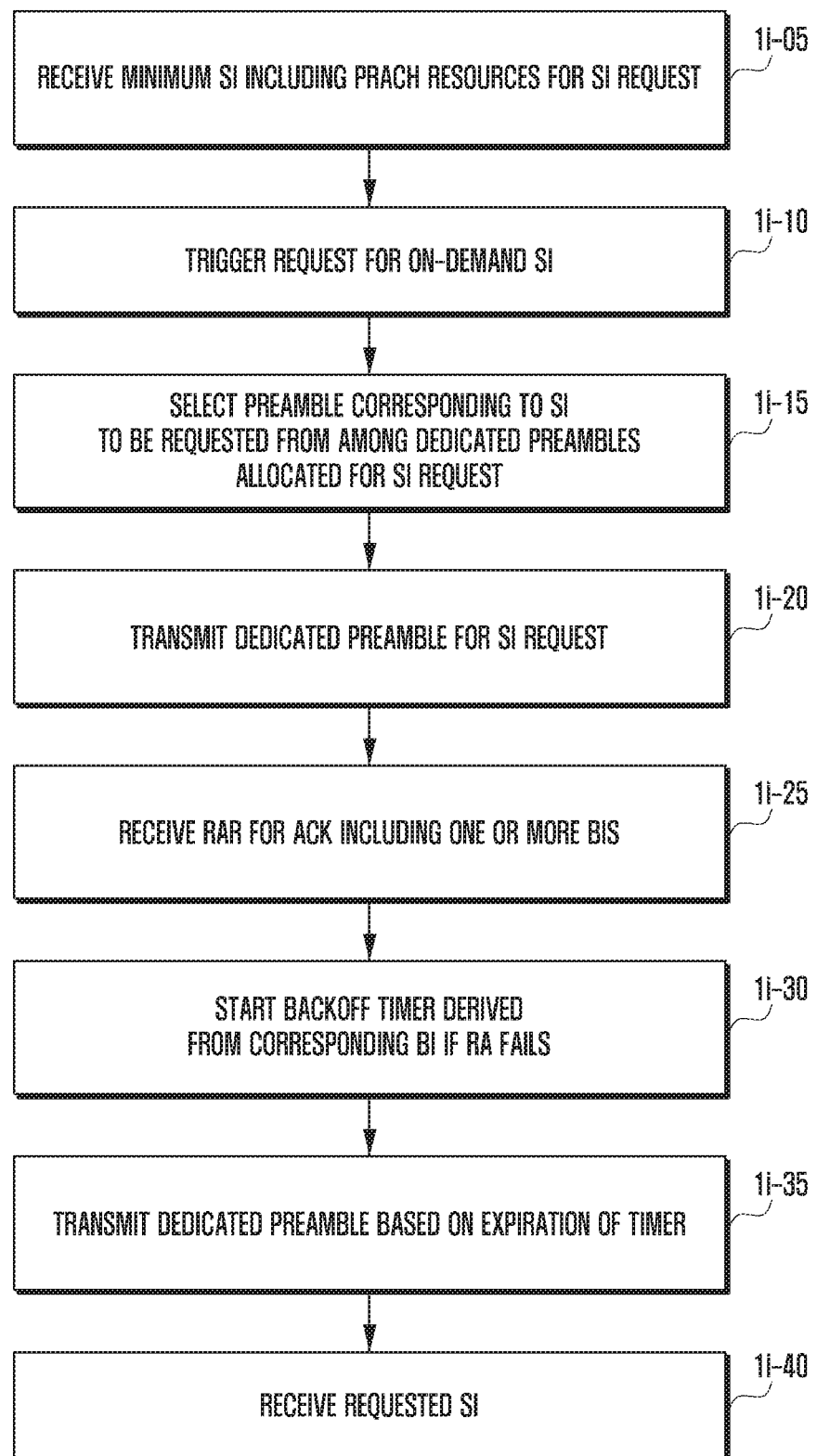
FIG. 1I is a flowchart illustrating the operation of the UE according to the present disclosure.

FIG. 1I is a flowchart illustrating the operation of the UE according to the present disclosure.

In step 1i-05, the UE receives minimum SI including PRACH radio resources allocated for the SI request from the network. In step 1i-10, the UE triggers an SI request process. In step 1i-15, the UE selects a preamble for the SI request in consideration of an SI message or a SIB for which the UE itself should make a request. In step 1i-20, the UE transmits the selected preamble for the SI request.

In step 1i-25, the UE successfully receives an RAR. The RAR may include one or more MAC subheaders including a BI. However, if a MAC subheader including a BI which is applied to the random access for the msg-1-based SI request is not received, the backoff time is considered to be 0. In step 1i-30, if it is considered that the random access is failed, the UE drives the derived backoff timer in consideration of the BI corresponding to the type of the random access. If there is no corresponding BI, the backoff time is considered to be 0.

In step 1i-35, if the timer expires, the UE may transmit the preamble for the SI request again. In step 1i-40, the UE receives the requested SI from the network.

FIG. 1J illustrates a method of indicating system information of a target cell during handover according to the present disclosure.

A UE 1j-05 receives minimum SI from a source gNB 1j-10 in step 1j-20. The UE may make a request for required SI to the source gNB through configuration information required for an SI request included in the minimum SI in step 1j-25. The source gNB transmits the requested SI to the UE in step 1j-30.

The source gNB determines to perform handover on the basis of measurement information received from the UE and transmits an HO request message to a target gNB 1j-15 in step 1j-35. The HO request message includes SI possessed by the UE. The target gNB transfers SI information that is required when the UE stays in the target gNB to the source gNB in step 1j-40 on the basis of the SI.

The source gNB transmits an HO command message indicating handover to the UE, and the message includes SI information required when the UE stays in the target gNB, SI information which the target gNB can reuse among SI of the source gNB currently applied, and an indicator indicating whether the SI request to the target gNB is needed in step 1j-45.

The UE successfully performs handover to the target gNB and transmits an HO complete message in step 1j-50. The UE determines whether to perform random access for the SI request to the target gNB in consideration of SI-related information included in the HO command in step 1j-55.

Particularly, if the indicator indicates that the SI request to the target gNB is not needed, the SI request is not made. When the SI request to the target gNB is needed, the UE performs the random access for the SI request to the target gNB in step 1j-60.

Figure 1K:
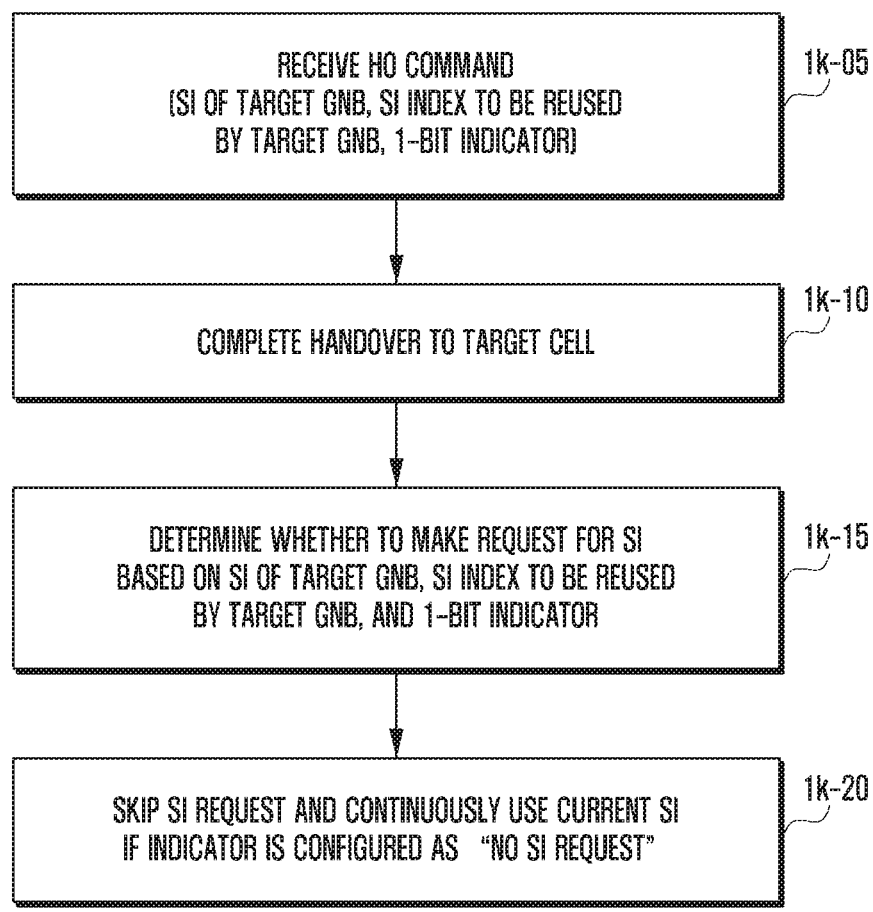
FIG. 1K is a flowchart illustrating the operation of the UE indicating system information of a target cell during a handover process according to the present disclosure.

FIG. 1K is a flowchart illustrating an operation of the UE indicating system information of a target cell during a handover process according to the present disclosure.

The UE receives an HO command message indicating handover from the network, and the message includes SI information required when the UE stays in the target gNB, SI information which the target gNB can reuse among the currently applied SI of the source gNB, and an indicator indicating whether the SI request to the target gNB is needed in step 1K-05.

In step 1k-10, the UE completes the operation of handover to the target cell. In step 1k-15, the UE determines whether the SI request to the target cell is needed in consideration of the SI-related information. In step 1k-20, if the indicator indicates that the SI request is not needed, the UE reuses the current SI information and does not make the SI request.

Figure 1L:
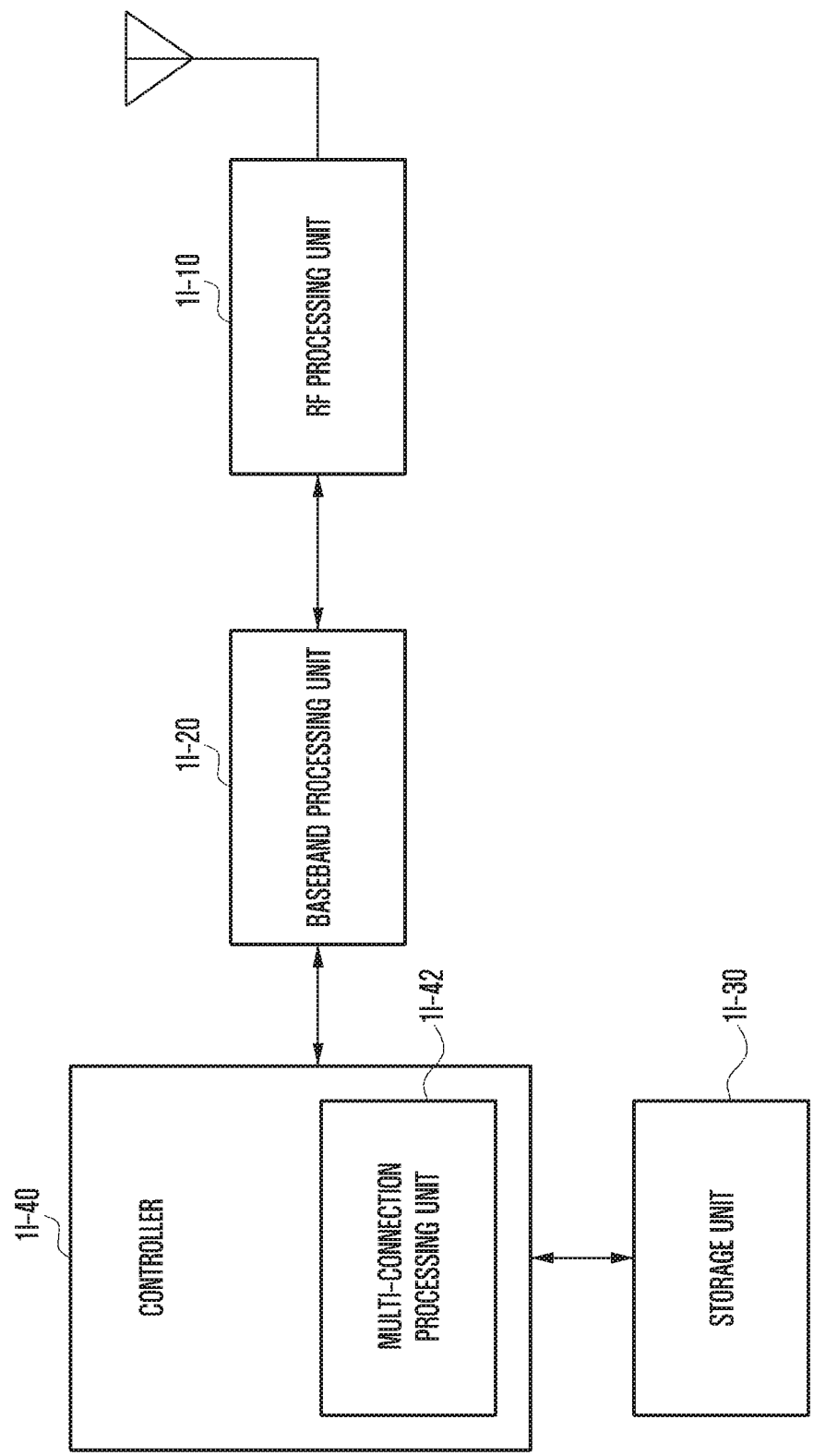
FIG. 1L is a block diagram illustrating the internal structure of the UE to which the present disclosure is applied.

FIG. 1L illustrates the structure of the UE.

Referring to FIG. 1L, the UE includes a radio-frequency (RF) processing unit 1l-10, a baseband processing unit 1l-20, a storage unit 1l-30, and a controller 1l-40.

The RF processing unit 1l-10 performs a function for transmitting and receiving a signal through a radio channel, such as band conversion and amplification of a signal. That is, the RF processing unit 1l-10 up-converts a baseband signal provided from the baseband processing unit 1l-20 into an RF band signal, transmits the RF band signal through an antenna, and then down-converts the RF band signal received through the antenna into a baseband signal. For example, the RF processing unit 1l-10 may include a transmission filter, a reception filter, an amplifier, a mixer, an oscillator, a digital-to-analog converter (DAC), an analog-to-digital converter (ADC), and the like. Although FIG. 1L illustrates only one antenna, the UE may include a plurality of antennas.

In addition, the RF processing unit 1l-10 may include a plurality of RF chains. Moreover, the RF processing unit 1l-10 may perform beamforming. For the beamforming, the RF processing unit 1l-10 may control the phase and the size of each signal transmitted/received through a plurality of antennas or antenna elements. Further, the RF processing unit may perform multiple-input multiple-output (MIMO) operation and receive a plurality of layers during MIMO operation.

The baseband processing unit 1l-20 performs a function of performing conversion between a baseband signal and a bitstream according to a physical layer standard of the system. For example, in data transmission, the baseband processing unit 1l-20 generates complex symbols by encoding and modulating a transmission bitstream.

In addition, the baseband processing unit 1l-20, when receiving data, reconstructs a reception bitstream through the demodulation and decoding of a baseband signal provided from the RF processing unit 1l-10. For example, in an orthogonal-frequency-division-multiplexing (OFDM) scheme, when data is transmitted, the baseband processing unit 1l-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion.

Further, in data reception, the baseband processing unit 1l-20 divides the baseband signal provided from the RF processing unit 1310 in units of OFDM symbols, reconstructs the signals mapped to the subcarriers through a fast Fourier transform (FFT) operation, and then reconstructs the reception bitstream through demodulation and decoding.

The baseband processing unit 1l-20 and the RF processing unit 1l-10 transmit and receive the signal as described above. Accordingly, the baseband processing unit 1l-20 and the RF processing unit 1l-10 may be referred to as a transmitter, a receiver, a transceiver, or a communication unit.

Further, at least one of the baseband processing unit 1l-20 and the RF processing unit 1l-10 may include a plurality of communication modules to support a plurality of different radio access technologies. In addition, at least one of the baseband processing unit 1l-20 and the RF processing unit 1l-10 may include different communication modules to process signals of different frequency bands. For example, the different radio access technologies may include a wireless LAN (for example, IEEE 802.11) and a cellular network (for example, LTE). Further, the different frequency bands may include a super-high-frequency (SHF) (for example, 2.5 GHz and 2 GHz) band and a millimeter (mm)-wave (for example, 60 GHz) band.

The storage unit 1l-30 stores data such as a basic program, an application program, and setting information for the operation of the UE. Particularly, the storage unit 1l-30 may store information related to a second access node for performing wireless communication through a second radio access technology. The storage unit 1l-30 provides stored data according to a request from the controller 1l-40.

The controller 1l-40 controls the overall operation of the UE. For example, the controller 1l-40 transmits and receives a signal through the baseband processing unit 1l-20 and the RF processing unit 1l-10. Further, the controller 1l-40 records data in the storage unit 1l-40 and reads the data. To this end, the controller 1l-40 may include at least one processor. For example, the controller 1l-40 may include a communication processor (CP), which performs control for communication, and an application processor (AP), which controls a higher layer such as an application program.

Figure 1M:
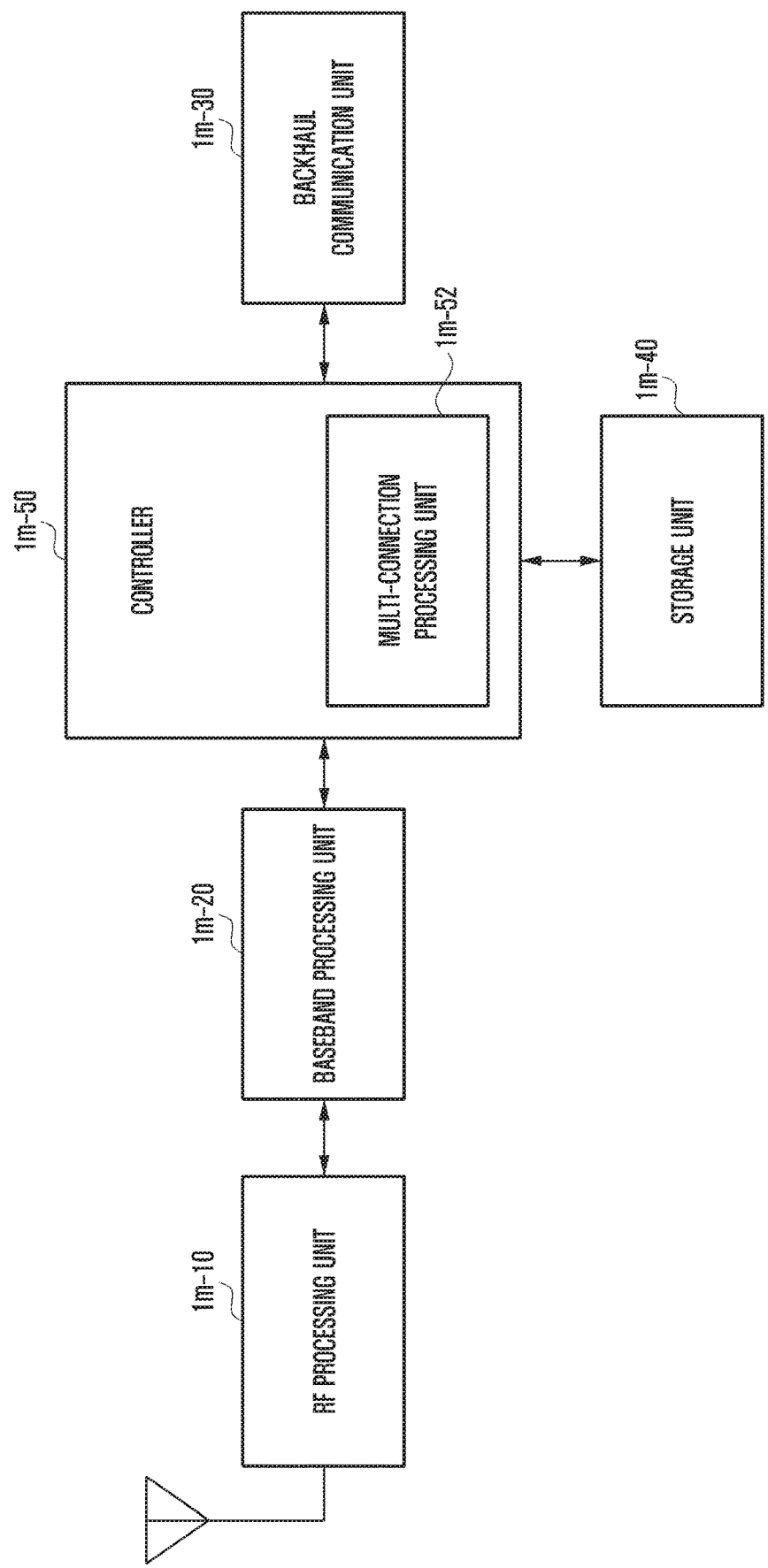
FIG. 1M is a block diagram illustrating the configuration of the eNB according to the present disclosure.

FIG. 1M is a block diagram of an MeNB in a wireless communication system according to an embodiment of the present disclosure.

As illustrated in FIG. 1M, the eNB includes an RF processing unit 1m-10, a baseband processing unit 1m-20, a backhaul communication unit 1m-30, a storage unit 1m-40, and a controller 1m-50.

The RF processing unit 1m-10 performs a function for transmitting and receiving a signal through a wireless channel, such as band conversion and amplification of a signal. That is, the RF processing unit 1m-10 up-converts a baseband signal provided from the baseband processing unit 1m-20 into an RF band signal, transmits the RF band signal through an antenna, and then down-converts the RF band signal received through the antenna into a baseband signal. For example, the RF processing unit 1m-10 may include a transmission filter, a reception filter, an amplifier, a mixer, an oscillator, a DAC, and an ADC. Although FIG. 1M illustrates only one antenna, the first access node may include a plurality of antennas.

In addition, the RF processing unit 1m-10 may include a plurality of RF chains. The RF processing unit 1m-10 may perform beamforming. For the beamforming, the RF processing unit 1m-10 may control the phase and the size of each of the signals transmitted and received through a plurality of antennas or antenna elements. The RF processing unit may perform a downlink MIMO operation by transmitting one or more layers.

The baseband processing unit 1m-20 performs a function of performing conversion between a baseband signal and a bitstream according to a physical layer standard of the first radio access technology. For example, in data transmission, the baseband processing unit 1m-20 generates complex symbols by encoding and modulating a transmission bitstream. In addition, in data reception, the baseband processing unit 1m-20 recovers a reception bit string through the demodulation and decoding of a baseband signal provided from the RF processing unit 1m-10. For example, in an OFDM scheme, when data is transmitted, the baseband processing unit 1m-20 generates complex symbols by encoding and modulating the transmission bitstream, maps the complex symbols to subcarriers, and then configures OFDM symbols through an IFFT operation and CP insertion.

Further, in data reception, the baseband processing unit 1m-20 divides the baseband signal provided from the RF processing unit 1m-10 in units of OFDM symbols, reconstructs the signals mapped to the subcarriers through an FFT operation, and then reconstructs the reception bitstream through demodulation and decoding. The baseband processing unit 1m-20 and the RF processing unit 1m-10 transmit and receive the signal as described above. Accordingly, the baseband processing unit 1m-20 and the RF processing unit 1m-10 may be referred to as a transmitter, a receiver, a transceiver, a communication unit, or a wireless communication unit.

The backhaul communication unit 1m-30 provides an interface for communicating with other nodes within the network. That is, the backhaul communication unit 1m-30 converts a bitstream transmitted to another node, for example, another BS or a core network, from the BS into a physical signal and converts the physical signal received from the other node into the bitstream.

The storage unit 1m-40 stores a basic program, an application program, and data such as configuration information for the operation of the MeNB. Particularly, the storage unit 1m-40 may store information on a bearer allocated to the accessed UE and a measurement result reported from the accessed UE. Further, the storage unit 1m-40 may store information which is a reference for determining whether to allow or interrupt multiple accesses to the UE. The storage unit 1m-40 provides stored data according to a request from the controller 1m-50.

The controller 1m-50 controls the overall operation of the MeNB. For example, the controller 1m-50 transmits and receives a signal through the baseband processing unit 1m-20 and the RF processing unit 1m-10 or the backhaul communication unit 1m-30. Further, the controller 1m-50 records data in the storage unit 1m-40 and reads the data. To this end, the controller 1m-50 may include at least one processor.

Second Embodiment

Figure 2A:
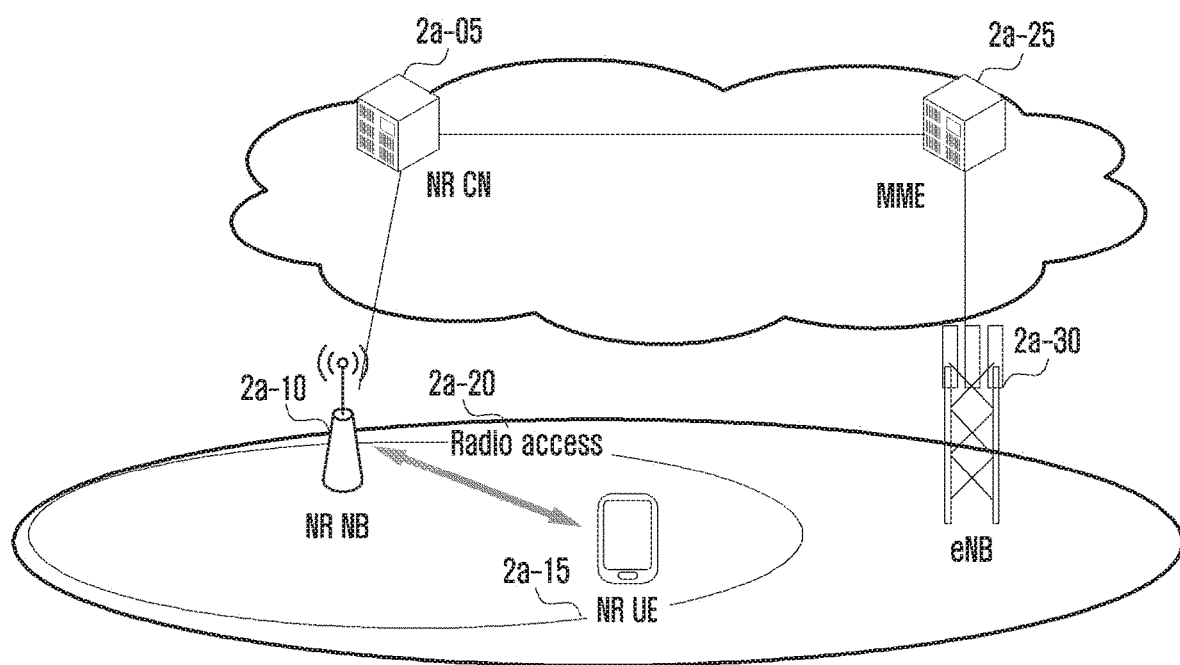
FIG. 2A illustrates the structure of a next-generation mobile communication system.

FIG. 2A illustrates the structure of a next-generation mobile communication system.

Referring to FIG. 2A, a radio access network of the next-generation mobile communication system includes a next-generation base station (hereinafter, referred to as new radio node B (NR NB) 2a-10 and a new radio core network (NR CN) 2a-05 as illustrated in FIG. 2A. A user terminal (hereinafter, referred to as a new radio user equipment (NR UE) or a UE) 2a-15 accesses an external network through the NR NB 2a-10 and the NR CN 2a-05.

In FIG. 2A, the NR NB 2a-10 corresponds to an evolved Node B (eNB) of the conventional LTE system. The NR NB may be connected to the NR UE 2a-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR NB 2a-10.

One NR NB generally controls a plurality of cells. The NR NB may have a bandwidth wider than the conventional maximum bandwidth in order to implement super-high-speed data transmission compared to conventional LTE and may apply orthogonal frequency division multiplexing (OFDM) through radio access technology and further apply beamforming technology. Further, a modulation scheme and an adaptive modulation and coding (hereinafter, referred to as an AMC) scheme of determining a channel coding rate are applied to the LTE system in accordance with the channel status of the UE.

The NR CN 2a-05 performs a function of supporting mobility, configuring a bearer, and configuring QoS. The NR CN is a device for performing a function of managing the mobility of the UE and various control functions, and is connected to a plurality of eNBs. Further, the next-generation mobile communication system may be linked to the conventional LTE system, and the NR CN is connected to an MME 2a-25 through a network interface. The MME is connected to an eNB 2a-30, which is a conventional eNB.

Figure 2B:
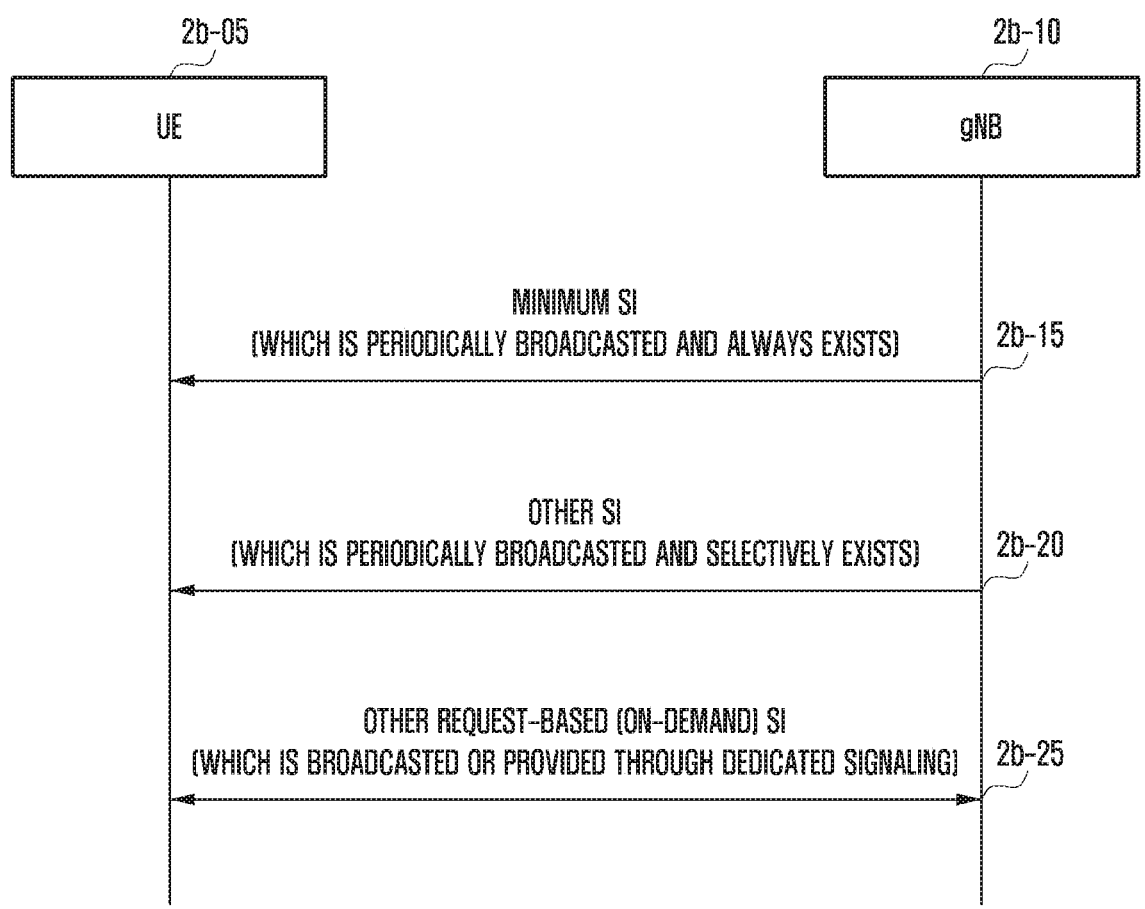
FIG. 2B illustrates a method of providing system information in the next-generation mobile communication system.

FIG. 2B illustrates a method of providing system information in the next-generation mobile communication system.

In the next-generation mobile communication system, system information broadcasted by a gNB 2b-10 is largely divided into minimum system information (SI) and other system information.

The minimum SI is periodically broadcasted, as indicated by reference numeral 2b-15, and includes configuration information required for initial access and SI scheduling information required for receiving other SI, broadcasted periodically or in response to a request.

Basically, the other SI includes all pieces of configuration information that are not included in the minimum SI. The other SI is broadcasted periodically as indicated by reference numeral 2b-20 or in response to a request from the UE, or is provided to the UE through dedicated signaling, as indicated by reference numeral 2b-25. When the other SI is received through a UE request, the UE is required to identify whether the other SI is valid in the cell or is currently being broadcasted (by a request from another UE) before the request. The identification can be performed through particular information provided by the minimum SI.

An idle-mode (RRC_IDLE) UE or an inactive-mode (RRC_INACTIVE) UE may make a request for other SI without changing a current RRC state. A connected-mode (RRC_CONNECTED) UE may make a request for and receive other SI through dedicated RRC signaling. The other SI is broadcasted at a predetermined cycle for a predetermined period of time. Public warning system (PWS) information is classified and provided as other SI. Whether to broadcast the other SI or to provide the same to the UE through dedicated RRC signaling is implemented by the network.

Figure 2C:
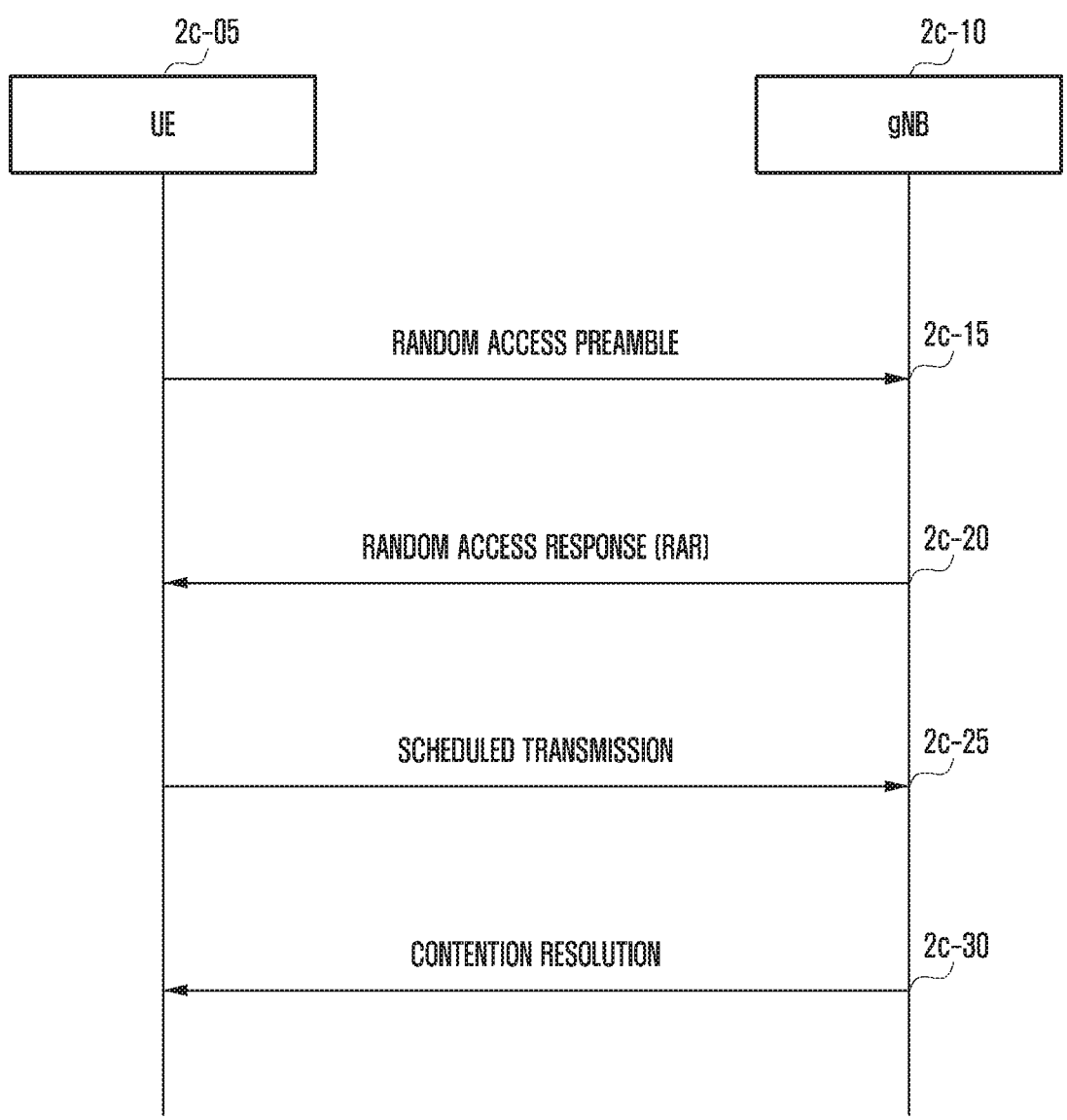
FIG. 2C illustrates a random access process in the conventional LTE system.

FIG. 2C illustrates a random access process in a conventional LTE system.

Random access is performed when uplink synchronization is performed or when data is transmitted to the network. More specifically, random access may be performed when switching from an idle mode to a connected mode, when RRC reestablishment is performed, when handover is performed, and when uplink/downlink data transmission starts.

Upon receiving a dedicated preamble from a gNB 2c-10, a UE 2c-05 applies and transmits the preamble. Otherwise, the UE selects one of two preamble groups and selects a preamble belonging to the selected group. The groups are referred to as group A and group B. If a channel quality status is higher than a particular threshold value and the size of msg 3 is larger than a particular threshold value, the UE selects the preamble belonging to group B and, otherwise, selects the preamble belonging to group A.

The preamble is transmitted in an $n^{th}$ subframe as indicated by reference numeral 2c-15. When the preamble is transmitted in the $n^{th}$ subframe, an RAR window starts from an $n+3^{th}$ subframe and it is monitored whether the RAR is transmitted within the window time interval as indicated by reference numeral 2c-20. Scheduling information of the RAR is indicated by an RA-RATI of a PDCCH. The RA-RNTI is induced using the location of radio resources on time and frequency axes used for transmitting the preamble. The RAR includes a timing advance command, a UL grant, and a temporary C-RNTI.

If the RAR is successfully received in the RAR window, msg 3 is transmitted using information of the UL grant included in the RAR, as indicated by reference numeral 2c-25. Msg 3 includes different pieces of information depending on the purpose of the random access. [Table 2] below is an example of information carried on msg 3.

TABLE 2

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicated preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicated preamble) | BSR, PHR, (part of) DCCH/DTCH SDU |

If the RAR is received in an $n^{th}$ subframe, msg 3 is transmitted in an $n+6^{th}$ subframe. HARQ is applied to msg 3 and thereafter. After msg 3 transmission, the UE drives a particular timer and monitors a contention resolution (CR) message before the timer expires, as indicated by reference numeral 2c-30. The CR message includes an RRC connection setup message or an RRC connection reestablishment message depending on the purpose of the random access as well as a CR MAC CE.

Figure 2D:
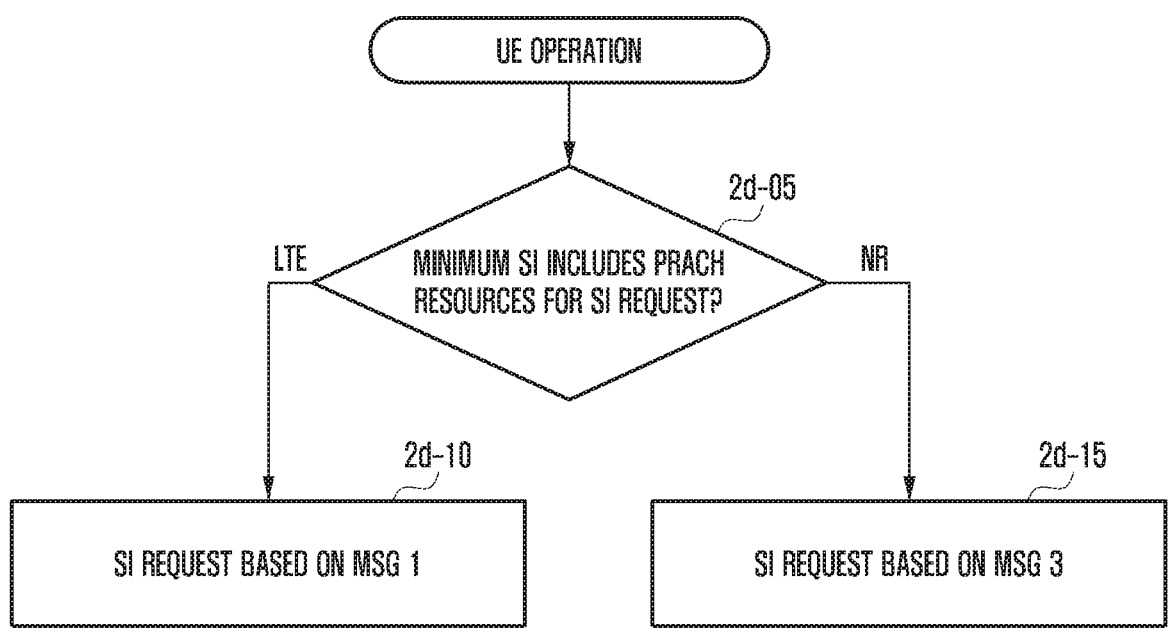
FIG. 2D illustrates a process of selecting an msg-1-based or an msg-3-based SI request method according to the present disclosure.

FIG. 2D illustrates a process of selecting an msg 1- or msg-3-based SI request method according to the present disclosure.

In order to make a request for system information other than the minimum SI, the UE uses random access. The UE makes a request for system information, which the UE desires to receive, to the network through msg 1 (preamble) or msg 3. In step 2d-05, the UE determines whether PRACH resource information, which can be used for an SI request, is included in the periodically broadcasted minimum SI.

The PRACH resource information may include preamble ID (or index) information used for the SI request (prach-ConfigIndex) and radio resource information for transmitting the preamble. If the minimum SI includes the information, the UE may make a request for system information other than the minimum SI through msg 1 for the SI request in step 2d-10. Otherwise, the UE makes a request for system information other than the minimum SI through msg 3 in step 2d-15. At this time, the UE transmits the preamble used for the general random access.

Figure 2E:
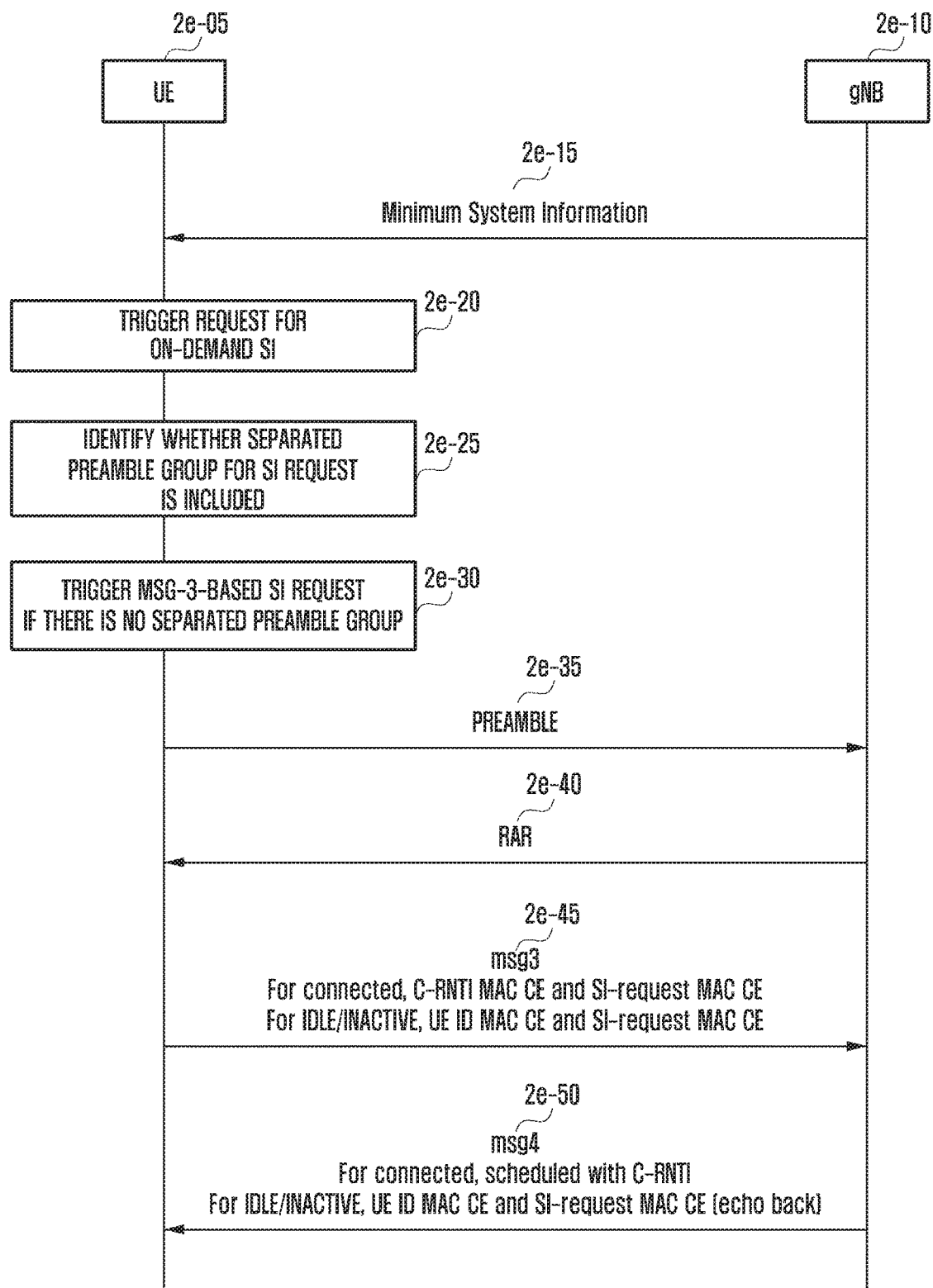
FIG. 2E illustrates an msg-3-based SI request process according to the present disclosure.

FIG. 2E illustrates an msg-3-based SI request process according to the present disclosure.

A UE 2e-05 receives minimum SI from a network 2e-10 in step 2e-15. The UE triggers a request for system information other than the minimum SI in step 2e-20. The UE determines whether dedicated preamble information for the SI request is included in the minimum SI in step 2e-25. If the dedicated preamble information is not included, the UE makes a request for SI through msg 3 in step 2e-30.

The UE transmits a preamble to the network in step 2e-35. The preamble is not necessarily a preamble for the SI request. The UE receives a random access response message for the preamble from the network in step 2e-40. The UE transmits msg 3 to the network in step 2e-45. Msg 3 includes information indicating which type of SI message or SIB is requested by the UE.

Further, configured MAC CE information varies depending on the RRC state of the UE. When the UE is in the connected mode, msg 3 includes a C-RNTI MAC CE and a MAC CE including SI request information (hereinafter, referred to as an SI-request MAC CE). The C-RNTI MAC CE includes C-RNTI information used for indicating a UE within a cell in the connected mode. While the size of the C-RNTI MAC CE is 2 bytes in LTE technology, the size may be larger in a next-generation mobile communication system.

When the UE is in the idle mode or the inactive mode, msg 3 includes a UE ID MAC CE and an SI-request MAC CE. The UE ID MAC CE includes UE ID information used for indicating a UE within a cell in the idle mode or the inactive mode. The UE ID information is used for determining whether, when the UE receives msg-4-message, the message corresponds to msg 3, which the UE transmitted.

When the UE is in the connected mode, the network receiving msg 3 transmits msg 4, scheduled with the C-RNTI, to the UE. When the UE is in the idle mode or the inactive mode, the network receiving msg 3 transmits msg 4 including the UE ID MAC CE and the SI-request MAC CE, which were included in msg 3 to the UE.

Figure 2F:
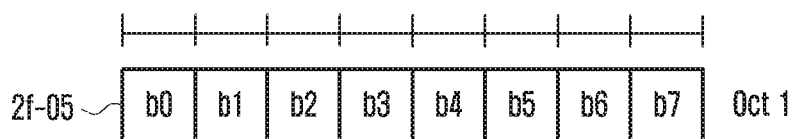
FIG. 2F illustrates a method of configuring an SI-request MAC CE according to the present disclosure.

FIG. 2F illustrates a method of configuring an SI-request MAC CE in the present disclosure.

The SI-request MAC CE has a variable size according to the number of requested SI messages or SIBs. Each bit is mapped to the SI message or SIB to be requested. The UE configures the corresponding bit as "1" and informs the network which SI message or SIB is requested. Further, a particular position bit may be used for indicating whether all SI messages or SIBs except for the minimum SI are requested, as indicated by reference numeral 2f-05.

Figure 2G:
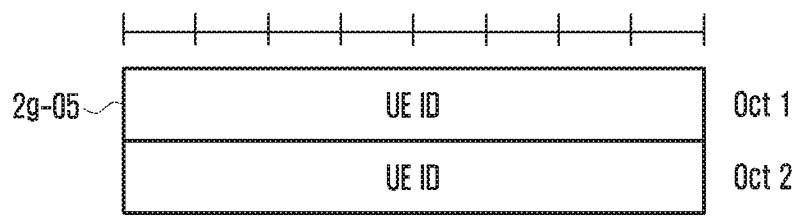
FIG. 2G illustrates a method of configuring a UE ID MAC CE according to the present disclosure.

FIG. 2G illustrates a method of configuring a UE ID MAC CE in the present disclosure.

The UE ID MAC CE 2g-05 has the same size as the C-RNTI MAC CE and includes one random value generated by the UE or a value derived from the UE ID. The UE ID MAC CE includes UE ID information used for indicating a UE within a cell in the idle mode or the inactive mode. The UE ID information is used for determining whether, when the UE receives msg 4, the message corresponds to msg 3, which the UE transmitted.

Figure 2H:
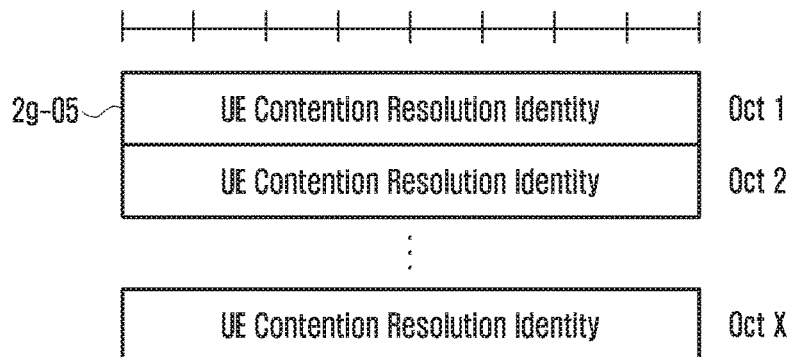
FIG. 2H illustrates a method of configuring a UE contention resolution identity included in msg 4 according to the present disclosure.
Figure 2I:
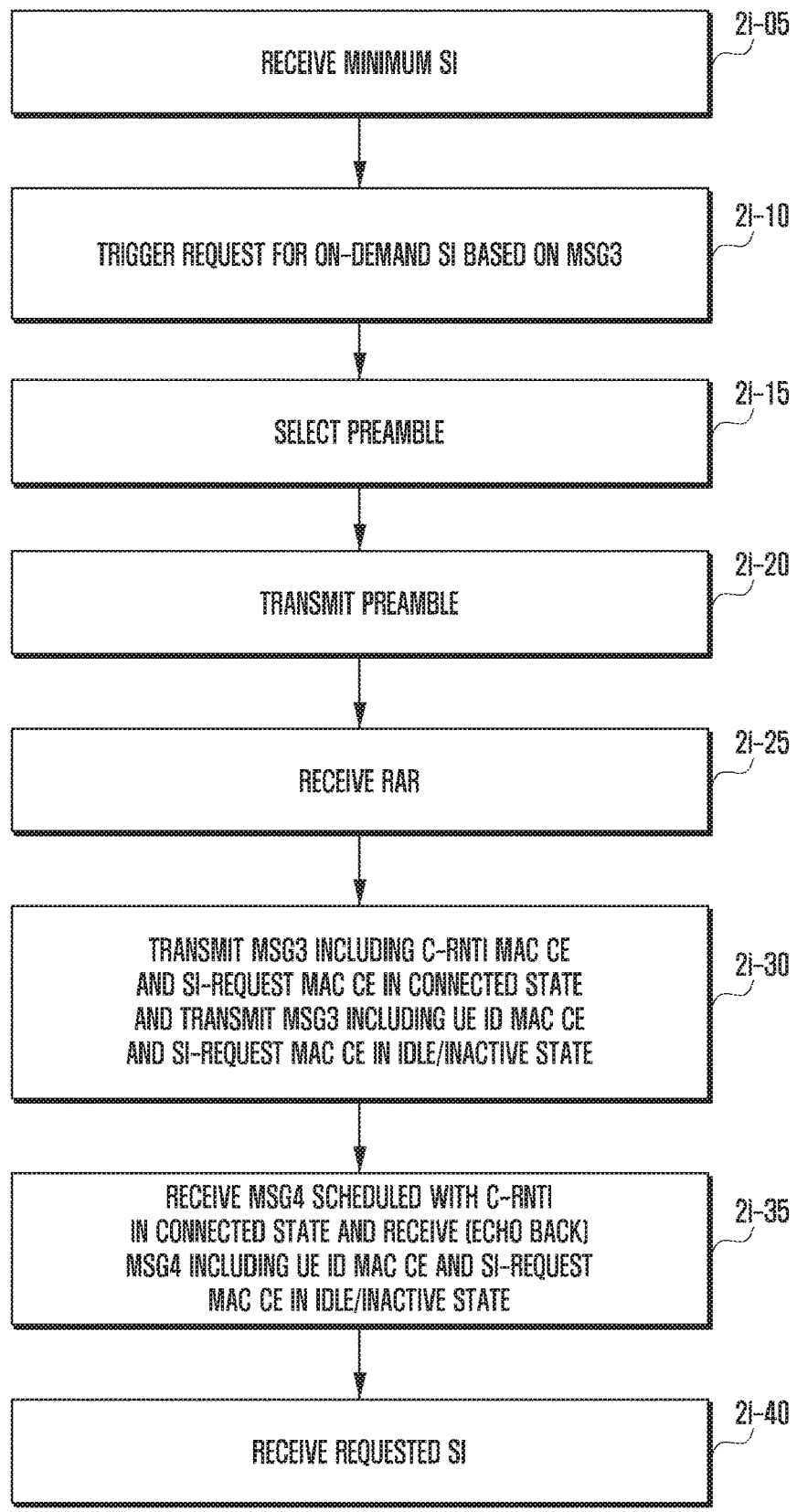
FIG. 2I is a flowchart illustrating the operation of the UE according to the present disclosure.

FIG. 2H illustrates a method of configuring a UE contention resolution identity included in msg 4 according to the present disclosure.

When the UE makes a request for SI in the idle mode or the inactive mode, the UE Contention Resolution Identity MAC CE 2h-05 is included in msg 4, which is a response message to msg 3. Information contained in the MAC CE having the fixed size is the UE ID CE and the SI-request MAC CE included in msg 3 or the UE ID MAC CE alone. When both the UE ID MAC CE and the SI-request MAC CE are included, the UE contention resolution identity MAC CE may be exceeded due to the variable size of the SI-request MAC CE, in which case the exceeded information is not included in the MAC CE. When only the UE ID MAC CE is included, the size of the UE contention resolution identity MAC CE is defined to be the same as the UE ID MAC CE.

Figure 2J:
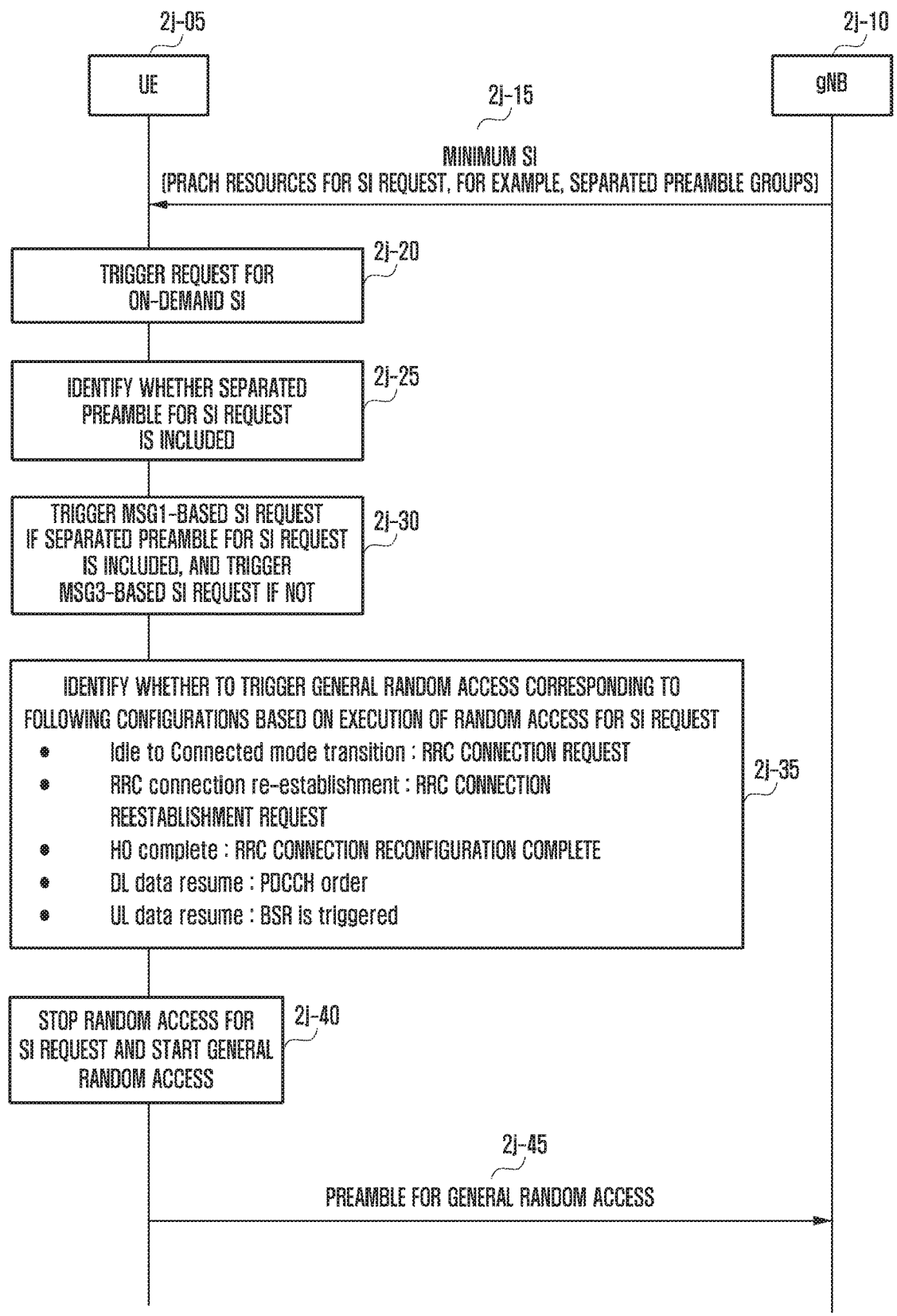
FIG. 2J illustrates a procedure of processing the case in which general random access and SI-request random access overlap each other in the present disclosure.
Figure 2K:
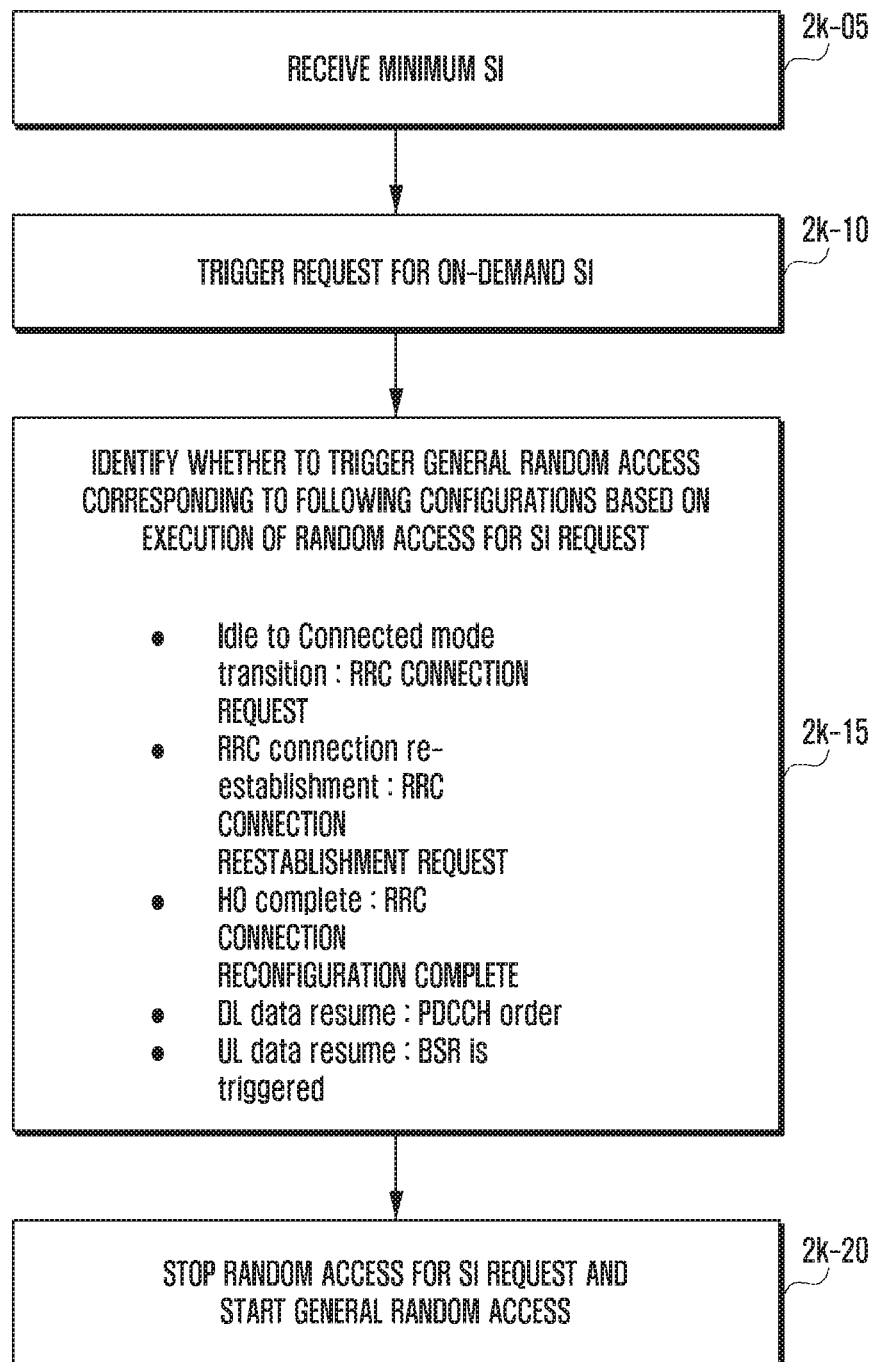
FIG. 2K is a flowchart illustrating the operation of the UE when general random access and SI-request random access overlap each other in the present disclosure.
Figure 2L:
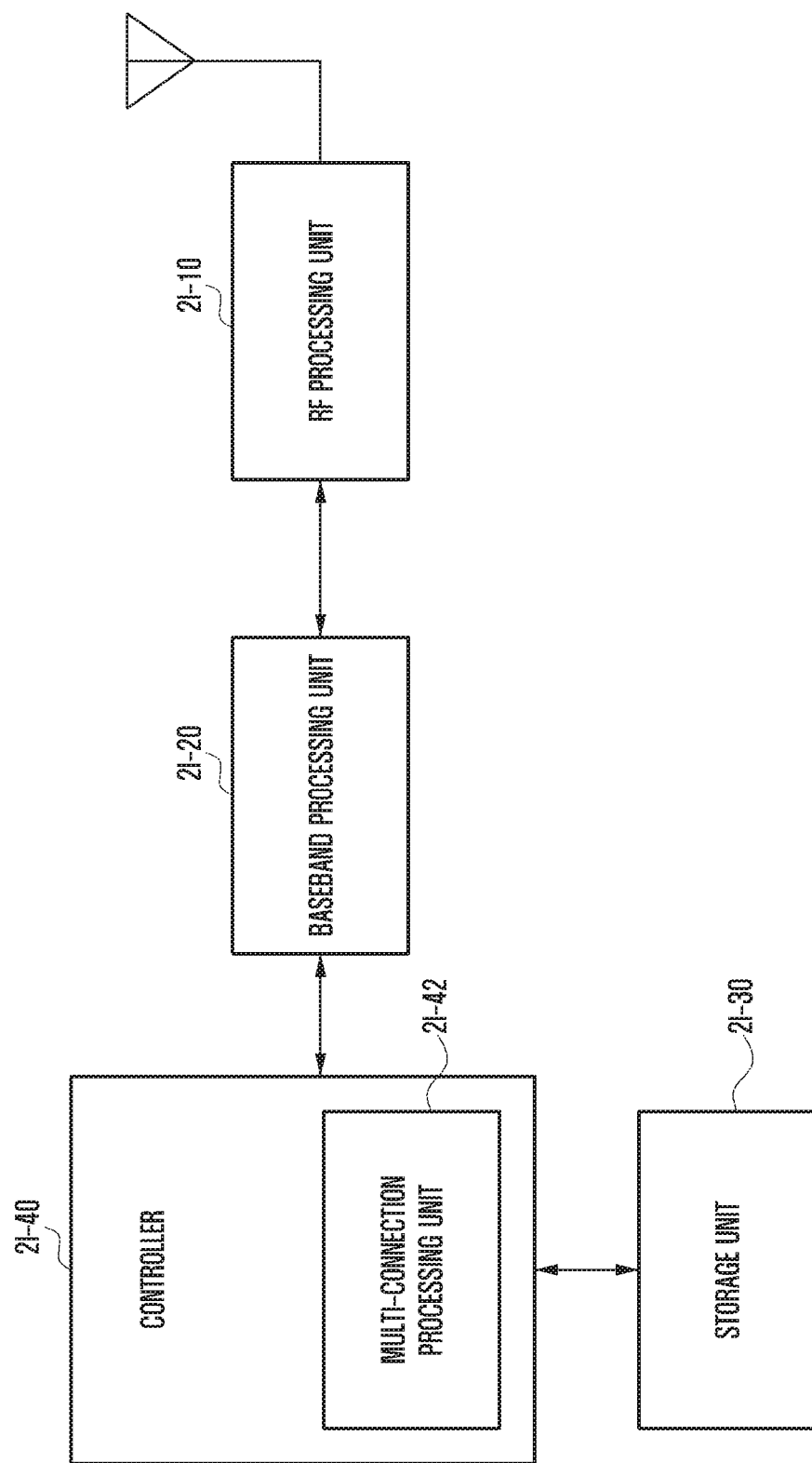
FIG. 2L is a block diagram illustrating the internal structure of the UE to which the present disclosure is applied.

FIG. 2l is a flowchart illustrating the operation of the UE according to the present disclosure.

In step 2i-05, the UE receives minimum SI. The minimum SI does not include msg 1 configuration information for an SI request. In step 2i-10, the UE triggers an SI request process through msg 3. In step 2i-15, the UE selects one preamble. In step 2i-20, the UE transmits the selected preamble.

In step 2i-25, the UE receives a random access response message corresponding to the preamble from the eNB. In step 2i-30, the UE transmits msg 3 to the eNB using scheduling information included in the response message. When the UE is in the connected mode, a C-RNTI MAC CE and an SI-request MAC CE are included in msg 3. When the UE is in the idle mode or the inactive mode, a UE ID MAC CE and an SI-request MAC CE are included in msg3.

In step 2i-35, the UE receives msg 4. The UE receives msg 4 scheduled with the C-RNTI when the UE is in the connected mode and receives msg 4 including both the UE ID MAC CE and the SI-request MAC CE or only the UE ID MAC CE when the UE is in the idle mode or the inactive mode. In step 2i-40, the UE receives requested system information.

FIG. 2J illustrates a procedure of processing the case in which general random access and SI request random access overlap each other in the present disclosure.

In the present disclosure, when general random access and SI-request random access overlap each other, general random access is preferentially performed. Necessary system information related to network connection may be included in the minimum SI and the remaining system information may be acquired through the UE request. Accordingly, when random access for connection to the network is triggered, it is preferable to perform the SI request in preference to the random access.

A UE 2j-05 receives minimum SI from a source gNB 2j-10 in step 2j-15. The minimum SI may include PRACH radio resource information for the SI request. The UE triggers a request for system information other than the minimum SI in step 2j-20. The UE determines whether preamble information dedicated for the SI request is included in the minimum SI in step 2j-25. If the preamble information is included, the SI is requested using the SI-request-dedicated preamble. If the preamble information is not included, the UE makes a request for SI through msg 3 in step 2j-30. If the SI request process is triggered, or during execution of the process, the UE determines whether general random access is triggered by the following causes in step 2j-35.

Idle to connected mode transition: RRC CONNECTION REQUEST

RRC connection re-establishment: RRC CONNECTION REESTABLISHMENT REQUEST

HO complete: RRC CONNECTION RECONFIGURATION COMPLETE

DL data resume: PDCCH order

UL data resume: BSR is triggered

When the general random access is triggered, the UE stops the SI request process triggered or being executed, and starts the general random access in step 2j-40. The UE transmits a preamble for the general random access to the network.

FIG. 2K is a flowchart illustrating the operation of the UE when general random access and SI-request random access overlap each other in the present disclosure.

In step 2k-05, the UE receives minimum SI from the eNB. The minimum SI may include PRACH radio resource information for the SI request. In step 2k-10, the UE triggers a request for system information other than the minimum SI. If the SI-request process is triggered or during the SI-request process, the UE determines whether general random access is triggered by the following causes in step 2k-15.

Idle to connected mode transition: RRC CONNECTION REQUEST

RRC connection re-establishment: RRC CONNECTION REESTABLISHMENT REQUEST

HO complete: RRC CONNECTION RECONFIGURATION COMPLETE

DL data resume: PDCCH order

UL data resume: BSR is triggered

If general random access is triggered, the UE stops the triggered SI-request process or the triggered SI-request process being executed and starts general random access in step 2k-20.

FIG. 2L illustrates the structure of the UE.

Referring to FIG. 2L, the UE includes a radio-frequency (RF) processing unit 2l-10, a baseband processing unit 2l-20, a storage unit 2l-30, and a controller 2l-40.

The RF processing unit 2l-10 performs a function for transmitting and receiving a signal through a wireless channel, such as band conversion and amplification of a signal. That is, the RF processing unit 2l-10 up-converts a baseband signal provided from the baseband processing unit 2l-20 into an RF band signal, transmits the RF band signal through an antenna, and then down-converts the RF band signal received through the antenna into a baseband signal. For example, the RF processing unit 2l-10 may include a transmission filter, a reception filter, an amplifier, a mixer, an oscillator, a Digital-to-Analog Converter (DAC), an Analog-to-Digital Converter (ADC), and the like. Although FIG. 2l illustrates only one antenna, the UE may include a plurality of antennas.

In addition, the RF processing unit 2l-10 may include a plurality of RF chains. Moreover, the RF processing unit 2l-10 may perform beamforming. For the beamforming, the RF processing unit 2l-10 may control the phase and the size of each signal transmitted/received through a plurality of antennas or antenna elements. The RF processing unit may perform MIMO and receive a plurality of layers during the MIMO operation.

The baseband processing unit 2l-20 performs a function of performing conversion between a baseband signal and a bitstream according to the physical layer standard of the system. For example, the baseband processing unit 2l-20, when transmitting data, generates complex symbols by encoding and modulating a transmission bitstream. In addition, in data reception, the baseband processing unit 2l-20 reconstructs a reception bitstream through the demodulation and decoding of a baseband signal provided from the RF processing unit 2l-10. For example, in an orthogonal-frequency-division-multiplexing (OFDM) scheme, when data is transmitted, the baseband processing unit 2l-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion.

Further, in data reception, the baseband processing unit 2l-20 divides the baseband signal provided from the RF processing unit 2l-10 in units of OFDM symbols, reconstructs the signals mapped to the subcarriers through a fast Fourier transform (FFT) operation, and then reconstructs the reception bitstream through demodulation and decoding.

The baseband processing unit 2l-20 and the RF processing unit 2l-10 transmit and receive the signal as described above. Accordingly, the baseband processing unit 2l-20 and the RF processing unit 2l-10 may be referred to as a transmitter, a receiver, a transceiver, or a communication unit. Further, at least one of the baseband processing unit 2l-20 and the RF processing unit 2l-10 may include a plurality of communication modules to support a plurality of different radio access technologies.

In addition, at least one of the baseband processing unit 2l-20 and the RF processing unit 2l-10 may include different communication modules to process signals of different frequency bands. For example, the different radio access technologies may include a wireless LAN (for example, IEEE 802.11) and a cellular network (for example, LTE). Further, the different frequency bands may include a super-high-frequency (SHF) (for example, 2.5 GHz and 2 GHz) band and a millimeter (mm) wave (for example, 60 GHz) band.

The storage unit 2l-30 stores data such as a basic program, an application program, and setting information for the operation of the UE. Particularly, the storage unit 2l-30 may store information related to a second access node for performing wireless communication through a second radio access technology. The storage unit 2l-30 provides stored data in response to a request from the controller 2l-40.

The controller 2l-40 controls the overall operation of the UE. For example, the controller 2l-40 transmits and receives a signal through the baseband processing unit 2l-20 and the RF processing unit 2l-10. Further, the controller 2l-40 records data in the storage unit 2l-40 and reads the data. To this end, the controller 2l-40 may include at least one processor. For example, the controller 2l-40 may include a communication processor (CP), which performs control for communication, and an application processor (AP), which controls a higher layer such as an application program.

Figure 2M:
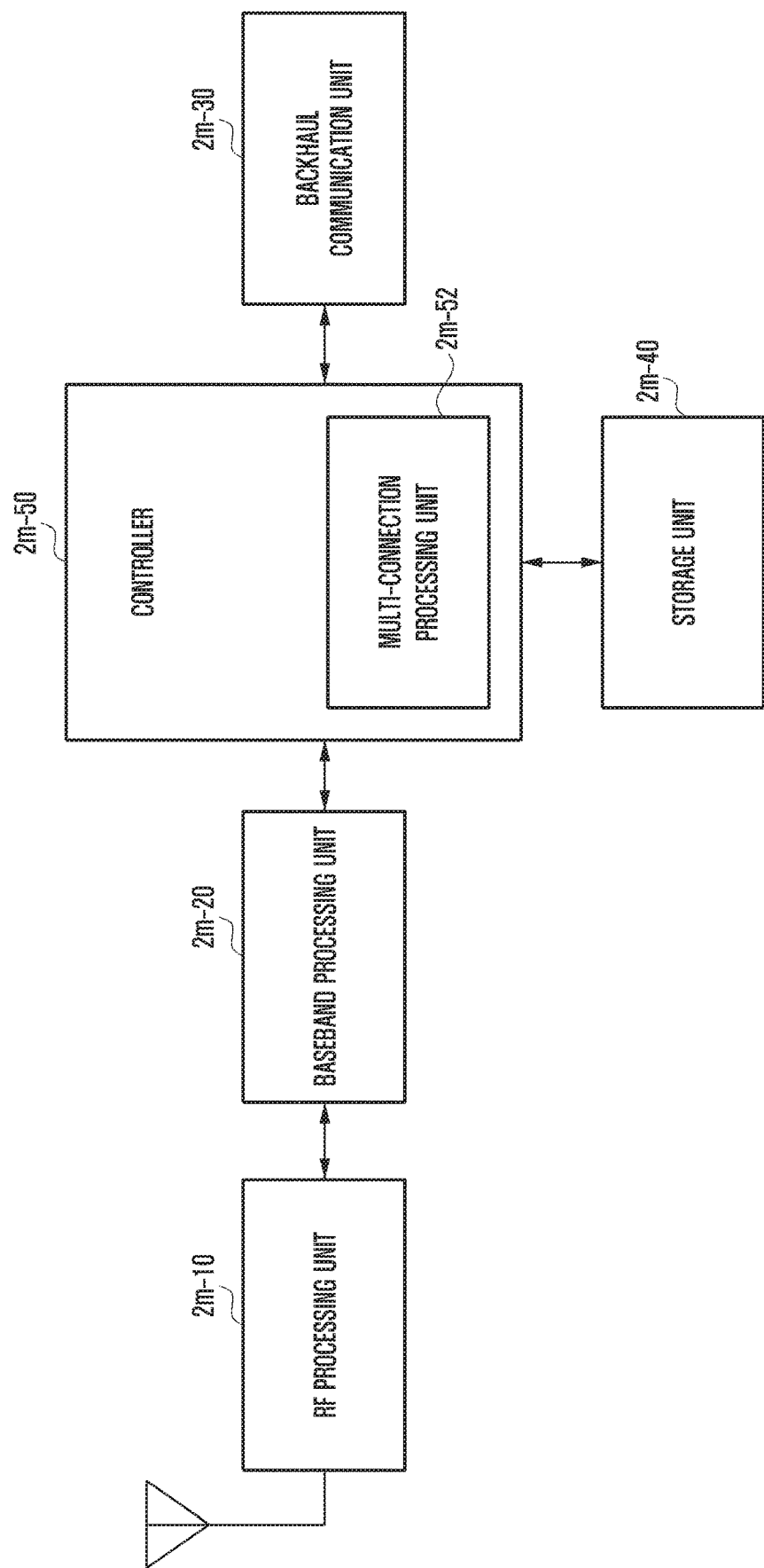
FIG. 2M is a block diagram illustrating the configuration of the eNB according to the present disclosure.

FIG. 2M is a block diagram of an MeNB in a wireless communication system according to an embodiment of the present disclosure.

As illustrated in FIG. 2M, the eNB includes an RF processing unit 2m-10, a baseband processing unit 2m-20, a backhaul communication unit 2m-30, a storage unit 2m-40, and a controller 2m-50.

The RF processing unit 2m-10 performs a function for transmitting and receiving a signal through a wireless channel, such as band conversion and amplification of a signal. That is, the RF processing unit 2m-10 up-converts a baseband signal provided from the baseband processing unit 2m-20 into an RF band signal, transmits the RF band signal through an antenna, and then down-converts the RF band signal received through the antenna into a baseband signal. For example, the RF processing unit 2m-10 may include a transmission filter, a reception filter, an amplifier, a mixer, an oscillator, a DAC, and an ADC. Although FIG. 2M illustrates only one antenna, the first access node may include a plurality of antennas.

In addition, the RF processing unit 2m-10 may include a plurality of RF chains. The RF processing unit 2m-10 may perform beamforming. For the beamforming, the RF processing unit 2m-10 may control the phase and size of each of the signals transmitted and received through a plurality of antennas or antenna elements. The RF processing unit may perform a downlink MIMO operation by transmitting one or more layers.

The baseband processing unit 2m-20 performs a function of performing conversion between a baseband signal and a bitstream according to a physical layer standard of the radio access technology. For example, in data transmission, the baseband processing unit 2m-20 generates complex symbols by encoding and modulating a transmission bitstream. In addition, in data reception, the baseband processing unit 2m-20 reconstructs a reception bit string through the demodulation and decoding of a baseband signal provided from the RF processing unit 2m-10. For example, in an OFDM scheme, when data is transmitted, the baseband processing unit 2m-20 may generate complex symbols by encoding and modulating the transmission bitstream, map the complex symbols to subcarriers, and then configure OFDM symbols through an IFFT operation and CP insertion.

Further, in data reception, the baseband processing unit 2m-20 divides the baseband signal provided from the RF processing unit 2m-10 in units of OFDM symbols, reconstructs the signals mapped to the subcarriers through an FFT operation, and then reconstructs the reception bitstream through demodulation and decoding. The baseband processing unit 2m-20 and the RF processing unit 2m-10 transmit and receive the signal as described above. Accordingly, the baseband processing unit 2m-20 and the RF processing unit 2m-10 may be referred to as a transmitter, a receiver, a transceiver, a communication unit, or a wireless communication unit.

The backhaul communication unit 2m-30 provides an interface for communicating with other nodes within the network. That is, the backhaul communication unit 2m-30 converts a bitstream transmitted to another node, for example, the SeNB or a core network from the MeNB, into a physical signal and converts the physical signal received from the other node into the bitstream.

The storage unit 2m-40 stores a basic program, an application, and data such as configuration information for the operation of the MeNB. Particularly, the storage unit 2m-40 may store information on a bearer allocated to the accessed UE and a measurement result reported from the accessed UE. Further, the storage unit 2m-40 may store information which is a reference for determining whether to allow or interrupt multiple accesses to the UE. The storage unit 2m-40 provides stored data according to a request from the controller 2m-50.

The controller 2m-50 controls the overall operation of the MeNB. For example, the controller 2m-50 transmits and receives a signal through the baseband processing unit 2m-20 and the RF processing unit 2m-10 or through the backhaul communication unit 2m-30. Further, the controller 2m-50 records data in the storage unit 2m-40 and reads the data. To this end, the controller 2m-50 may include at least one processor.

Third Embodiment

In the following description, terms for identifying an access node, terms referring to network entities, terms referring to messages, terms referring to interfaces between network entities, and terms referring to various pieces of identification information are used for convenience of description. Therefore, the present disclosure is not limited by the terminologies provided below, and other terms that indicate subjects having equivalent technical meanings may be used.

For convenience of description, the present disclosure uses terms and names defined in $3^{rd}$-generation partnership project long-term evolution (3GPP LTE) standard and LTE-advanced (LTE-A) standards, which are the latest standards among existing communication standards. However, the present disclosure is not limited to the terms and names, and may be equally applied to a system according to another standard. Particular, the present disclosure may be applied to 3GPP new radio (NR, $5^{th}$-generation mobile communication standard).

Figure 3A:
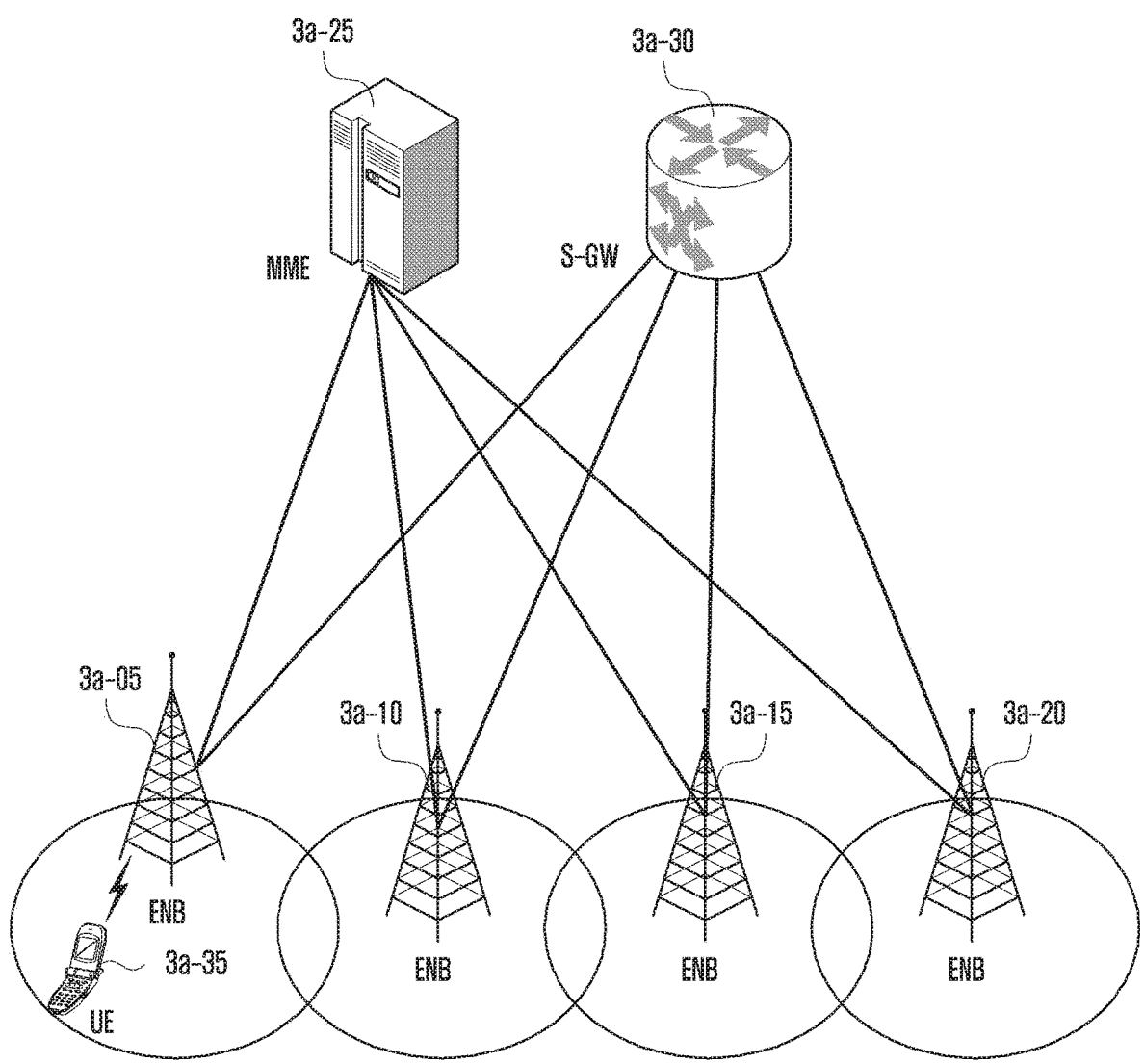
FIG. 3A illustrates the structure of the LTE system to be referred to for description of the present disclosure.

FIG. 3A illustrates the structure of the LTE system to be referred to for description of the present disclosure.

Referring to FIG. 3A, the wireless communication system includes a plurality of ENBs 3a-05, 3a-10, 3a-15, and 3a-20, a mobility management entity (MME) 3a-20, and a serving gateway (S-GW) 3a-30. A User Equipment (hereinafter, referred to as a UE or a terminal) 3a-35 accesses an external network through the ENBs 3a-05, 3a-10, 3a-15, and 3a-20 and the S-GW 3a-30.

The ENBs 3a-05, 3a-10, 3a-15, and 3a-20 provide radio access to UEs which access the network as access nodes of the cellular network. That is, in order to serve traffic of users, the ENBs 3a-05, 3a-10, 3a-15, and 3a-20 perform scheduling on the basis of collected status information such as buffer statuses, available transmission power statuses, and channel statuses of UEs and support connection between the UEs and a core network (CN).

The MME 3a-25 is a device performing a function of managing the mobility of the UE and various control functions and is connected to a plurality of ENBs, and the S-GW 3a-30 is a device providing a data bearer. The MME 3a-25 and the S-GW 3a-30 further perform authentication for the UE accessing the network and bearer management, and process packets received from the ENBs 3a-05, 3a-10, 3a-15, and 3a-20 or packets to be transferred to the ENBs 3a-05, 3a-10, 3a-15, and 3a-20.

Figure 3B:
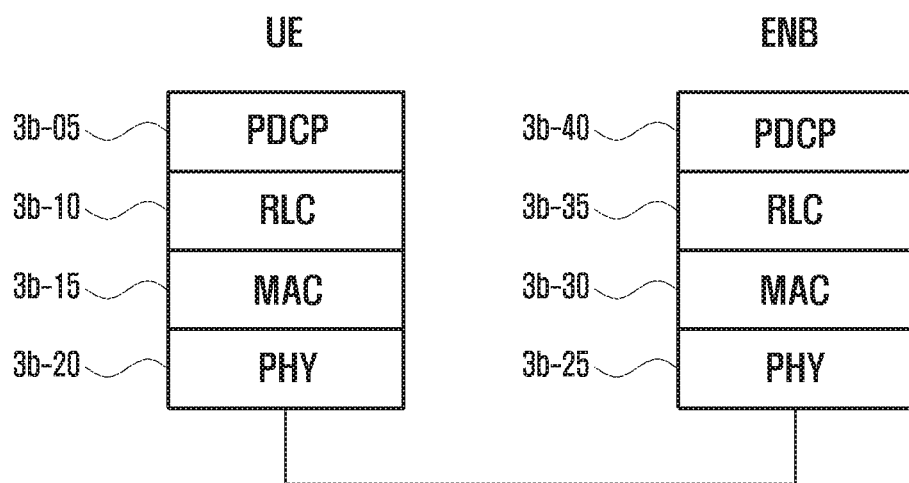
FIG. 3B illustrates a wireless protocol structure of the LTE system to be referred to for description of the present disclosure.

FIG. 3B illustrates a wireless protocol structure of the LTE system to be referred to for description of the present disclosure. The structure of the NR defined below may be different from the wireless protocol structure in FIG. 3B, but the wireless protocol structure will be described for convenience of the present disclosure.

Referring to FIG. 3B, the UE and the ENB includes packet data convergence protocols (PDCPs) 3b-05 and 3b-40, radio link controls (RLCs) 3b-10 and 3b-35, and medium access controls (MACs) 3b-15 and 3b-30, respectively, in the wireless protocol of the LTE system.

The packet data convergence protocols (PDCPs) 3b-05 and 3b-40 perform an operation of compressing/reconstructing an IP header, and the radio link controls (RLCs) 3b-10 and 3b-35 reconfigure a PDCP Packet data unit (PDU) to have a proper size. The MACs 3b-15 and 3b-30 are connected with various RLC layer devices included in one UE, and perform an operation for multiplexing RLC PDUs to the MAC PDU and de-multiplexing the RLC PDUs from the MAC PDU.

The PHY layers 3b-20 and 3b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the PHY layer uses hybrid ARQ (HARQ) to correct an additional error, and a receiving side transmits 1-bit information indicating whether a packet transmitted by a transmitting side is received. The 1-bit information is referred to as HARQ ACK/NACK information.

Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

Meanwhile, the PHY layer may include one or a plurality of frequencies/subcarriers, and technology in which one eNB simultaneously configures and uses a plurality of frequencies is referred to as carrier aggregation (CA). CA significantly increases the amount of transmission by the number of subcarriers by additionally using a primary carrier and one or a plurality of subcarriers, which is beyond the conventional technology, in which only one subcarrier is used for communication between the UE and the E-UTRAN NodeB (eNB).

Meanwhile, in LTE, a cell within the eNB using a primary carrier is referred to as a Primary Cell (PCell) and a secondary carrier is referred to as a Secondary Cell (SCell). The technology obtained by expanding the CA function to two eNBs is referred to as dual connectivity (DC). In the DC, the UE is simultaneously connected to and uses a master E-UTRAN NodeB (MeNB) and a secondary E-UTRAN NodeB (SENB), and cells belonging to the MeNB are referred to as a master cell group (MCG) and cells belonging to the SeNB are referred to as a secondary cell group (SCG).

Each cell group has a representative cell, and a representative cell of a master cell group is referred to as a primary cell (PCell) and a representative cell of a secondary cell group is referred to as a primary secondary cell (PSCell). When the NR is used, as the MCG uses LTE technology and the SCG uses NR, the UE may simultaneously use LTE and NT.

Although not illustrated, there is a radio resource control (RRC) layer above the PDCP layer of each of the UE and the eNB, and the RRC layer may transmit and receive an access- and measurement-related configuration control message to control radio resources. For example, measurement may be indicated to the UE through the RRC layer message and the UE may report the measurement result to the eNB through the RRC layer message.

Figure 3C:
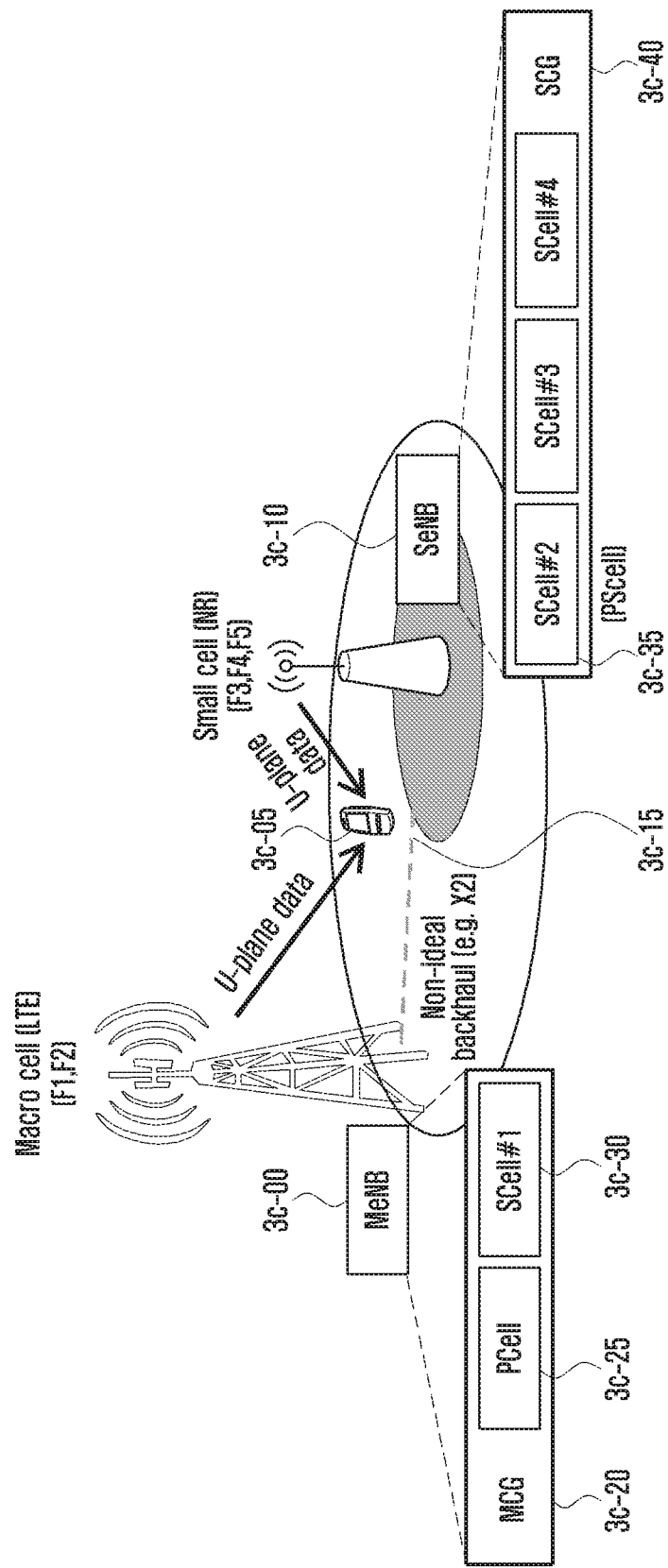
FIG. 3C illustrates the concept of multiple connections in LTE and NR.

FIG. 3C illustrates the concept of dual connectivity.

When the DC is used, the UE may be simultaneously connected to and use two eNBs. In FIG. 3C, a UE 3c-05 is simultaneously connected to a macro eNB 3c-00 using LTE technology and a small cell eNB 3c-10 using NR technology and transmits and receives data. This is referred to as E-UTRAN NR dual connectivity (EN-DC).

The macro eNB is referred to as a master E-UTRAN Node B (MeNB) and the small call eNB is referred to as a secondary 5G node B (SeNB). There may be a plurality of small cells within a service area of the MeNB, and the MeNB is connected to the SgNBs through a wired backhaul network 3c-15. A set of serving cells provided from the MeNB is referred to as a master cell group (MCG) 3c-20, and one serving cell in the MCG is necessarily a primary cell (PCell) 3c-25 having all functions performed by the existing cell, such as connection establishment, connection re-establishment, and handover.

In the PCell, an uplink control channel has a PUCCH. Serving cells other than the PCell are referred to as secondary cells (SCells) 3c-30. FIG. 3C illustrates a scenario in which the MeNB provides one SCell and the SgNB provides three SCells. A set of serving cells provided by the SgNB is referred to as a secondary cell group (SCG) 3c-40.

When the UE transmits and receives data to and from the two eNBs, the MeNB provides the SgNB with commands for adding, changing, and removing serving cells provided by the SgNB. In order to transmit the commands, the MeNB may configure the UE to measure the serving cell and neighboring cells. The UE should report the measurement result to the MeNB according to configuration information.

For efficient data transmission and reception to and from the UE by the SgNB, a serving cell which plays a similar role to the PCell of the MCG is required and the serving cell is referred to as a primary SCell (PSCell) in the present disclosure. One the serving cells of the SCG is determined as the PSCell, and the PSCell has a PUCCH which is an uplink control channel. The PUCCH is used when the UE transmits HARQ ACK/NACK information, channel status information (CSI), and a scheduling request (SR) to the eNB.

Figure 3D:
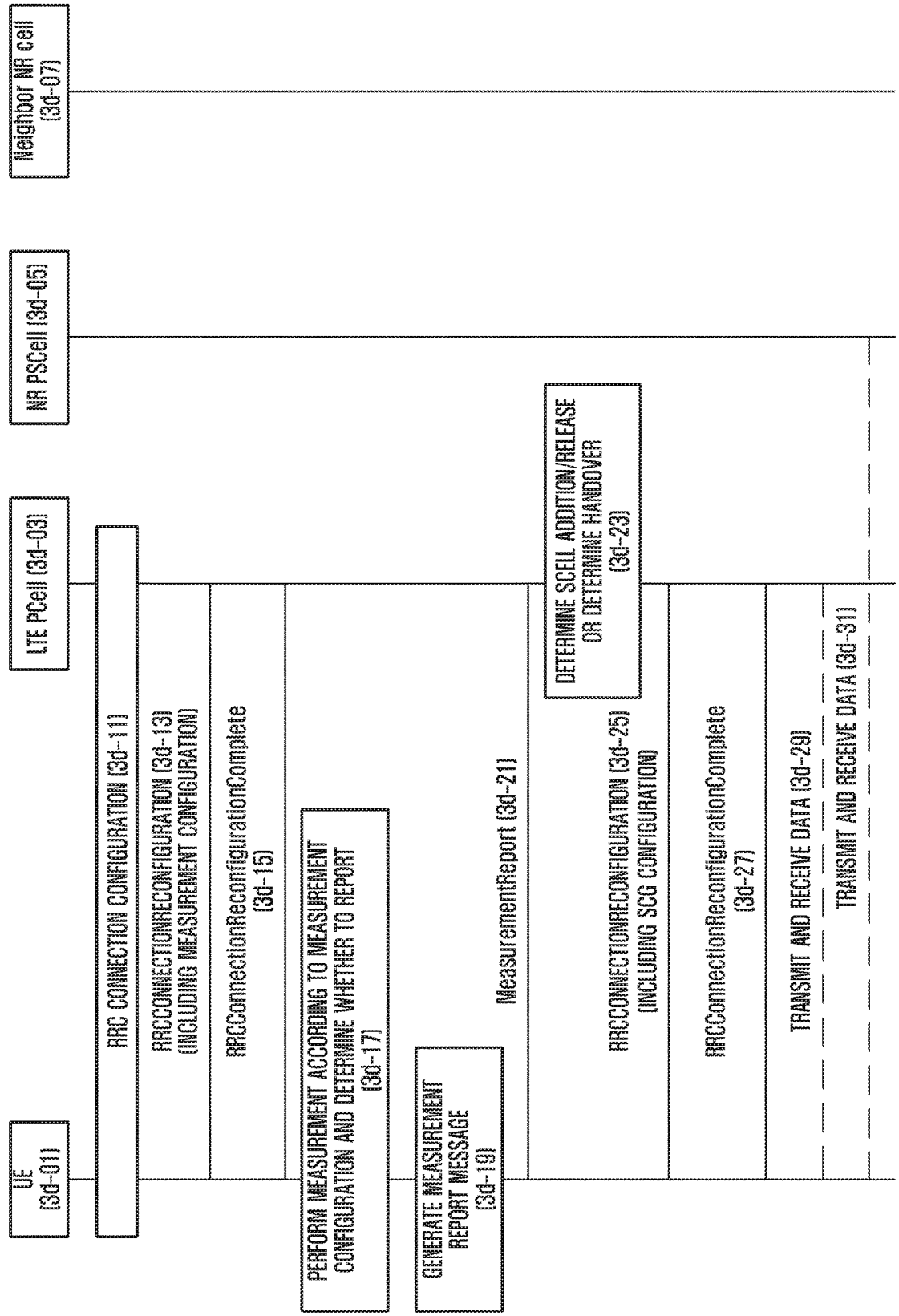
FIG. 3D illustrates an example of message flow between the UE and eNBs when the present disclosure is applied.

FIG. 3D illustrates an example of a message flow between the UE and eNBs when the UE starts measuring different types of RATs in the state in which eNBs using a plurality of RATs proposed by the present disclosures coexist.

In FIG. 3D, a UE 3d-01 in an idle mode (RRC_IDLE) accesses an LTE cell due to the generation of data to be transmitted in step 3d-11. In the idle mode, the UE is not connected to the network to save power of the UE, so the UE cannot transmit data. In order to transmit data, the UE is required to switch to a connected mode (RRC_CONNECTED). When the UE successfully accesses the LTE cell 3d-03, the UE switches to the connected mode (RRC_CONNECTED) and the connected-mode UE can transmit and receive data to and from the LTE cell through security activation and bearer configuration for data.

Thereafter, the eNB configures, in the UE, measurement of cells adjacent to the UE in step 3d-13. The measurement configuration may include a measurement object (measObject), a report configuration, a measurement start condition, and measurement interval information for other frequency measurement.

The measurement object may include information indicating which frequency will be measured, and the frequency information may include an LTE frequency. If the UE supports NR or supports DC with NR, an NR frequency may be included. The eNB may configure a plurality of measurement objects in the UE.

The report configuration may include a configuration for periodically reporting the measurement result to the eNB or for reporting the measurement result to the eNB when the following conditions are satisfied.

Event A1 (the case in which serving cell measurement result is better than threshold value)

Event A2 (the case in which serving cell measurement result is worse than threshold value)

Event A3 (the case in which neighboring cell measurement result is better than primary cell (PCell) (representative cell when the UE uses a plurality of serving cells) measurement result by offset or more)

Event A4 (the case in which neighboring cell measurement result is better than threshold value)

Event A5 (the case in which primary serving cell (PCell) measurement result is worse than threshold value 1 and neighboring cell measurement result is better than threshold value 2)

Event A6 (the case in which neighboring cell measurement result is better than secondary cell (SCell) (remaining cells other than PCell when the UE uses a plurality of serving cells) measurement result by offset or more)

The eNB may configure the plurality of report configurations in the UE.

The eNB groups the measurements and the report configurations and manages them through measurement identifiers. For example, when the eNB configures three measurement objects (for example, frequencies X, Y, and Z) and two report configurations (for example, report configuration 1: periodic report and report configuration 2: conditional report A3) in the UE, the eNB may map report identifier 1 to frequency X and report configuration 1 and map report identifier 2 to frequency Y and report configuration 2 and configure the same in the UE.

The measurement start condition (s-Measure) is one threshold value. When the signal intensity of the PCell, among the serving cells, is higher than the measurement start condition, the UE determines that the signal intensity of the currently accessed cell is good enough and does not measure neighboring cells. By configuring the measurement start condition, the UE does not unnecessarily measure neighboring cells, thereby reducing power consumption of the UE.

Meanwhile, in the state of the EN-DC, even though the channel state of the LTE PCell is good, it may be better not to stop measurement for NR neighboring cells. For example, if the UE uses the LTE PCell and then adds the NR cell to the SCG (that is, NR SCell addition), even though the channel state of the PCell is good, it may be preferable to continuously measure the NR cell to add the NR cell to the NR SCG in time. In another example, if there is an NR cell (providing a better transmission rate) near the UE while the UE uses the LTE PCell, it may be preferable to perform handover to the corresponding NR cell in time when the handover is possible. Accordingly, for the example scenario, the present disclosure includes additional information other than the s-Measure. For the additional information, for example, three schemes may be considered.

Scheme 1: indicator included for each measurement object (measObject)

The measurement object (frequency) included in the indicator is measured even when the signal intensity of the PCell is higher than the configured s-Measure.

Scheme 2: second s-Measure (applied only to NR)

When the second s-Measure is configured, the second s-Measure is used for determining whether to measure frequencies belonging to the SCG (for example, NR) or configured by the SCG.

In this case, the second s-Measure is included in the measurement configuration information configured by the NR SCG when EN-DC is configured in the UE.

Scheme 3: indicator included in the measurement configuration information in common.

In this case, the corresponding indicator is commonly applied to frequencies using a predetermined RAT technology (for example, NR).

The eNB may transmit various measurement configurations to the UE through an RRCConnectionReconfiguration message of the RRC layer. Thereafter, the UE transmits an acknowledgement message of the configuration indication in step 3d-15, in which case the UE may use an RRCConnectionReconfigurationComplete message of the RRC layer.

The UE receiving the measurement configuration information measures the same frequency as that of the current serving cell (intra-frequency), a different frequency (inter-frequency), and a frequency on which different types of RATs (inter-RAT) are used according to the configured information and determines whether to perform a report in step 3d-17.

At this time, the UE performs the following operation according to each of the schemes.

If the UE receives the configuration of the indicator for each frequency according to scheme 1 and the signal intensity (reference signal received power (RSRP)) of the PCell is smaller than the configured s-Measure value, the UE measures neighboring cells according to configuration information. However, if the RSRP of the PCell is higher than the configured s-Measure value, the UE does not measure a frequency which does not include the indicator, but measures a frequency including the indicator.

If the UE receives the configuration of a second s-Measure value according to scheme 2 and the signal intensity of the PCell is smaller than the existing s-Measure (referred to as a first s-Measure), the UE starts measuring a frequency on which RATs (for example, LTE, UMTS, and GSM) other than NR are used. When the signal intensity of the PCell is higher than the first s-Measure, the UE does not measure the frequency on which RATs (for example, LTE, UMTS, and GSM) other than NR are used. Meanwhile, the UE starts measuring NR when the signal intensity of the PCell is smaller than the second s-Measure and does not measure NR when the signal intensity of the PCell is higher than the second s-Measure.

In another embodiment, although not illustrated in FIG. 3D, the second s-Measure value may be configured through the SCG (SgNB) 3d-05. That is, in the state in which the SCG is added to the UE, the measurement information may be directly configured by the SCG and, at this time, the second s-Measure value may be included. In this case, the UE determines whether to measure a frequency configured to be measured by the MCG using the first s-Measure and determine whether to measure a frequency configured to be measured by the SCG (or a frequency using the same RAT as the RAT used by the SCG) using the second s-Measure value.

When the UE receives the configuration of a predetermined indicator included in common in the measurement configuration information according to scheme 3, the UE measures neighboring cells according to the configuration information if the signal intensity (reference signal received power (RSRP)) of the PCell is smaller than the configured s-Measure value. However, if the RSRP of the PCell is higher than the configured s-Measure value, the UE measures a frequency using a separately indicated or pre-appointed RAT (for example, NR) but does not measure other RAT and LTE frequencies.

According to the rule, the UE measures neighboring cells. When the configured report configuration is satisfied, the UE generates a measurement report message in step 3d-19 and transmits the same to the eNB in step 3d-21. The eNB receiving the measurement report message may determine whether to add the reported cell to the SCell or perform handover to the reported cell according to the content contained in the measurement report message. For example, by comparing the signal intensity of the current (LTE) PCell with the signal intensity of neighboring NR cells (with a predetermined offset for normalizing a bandwidth difference), the eNB may determine whether to add the NR cell to the SCG or to perform handover.

When the UE supports the DC and it is determined that the eNB adds the NR cell to the SCG for the UE according to the determination, the eNB transmits SCG information to configure the DC function to the UE in step 3d-25. The SCG configuration information may include addition and release information of SCells added to the SCG. The SCG configuration information may be transmitted using an RRCConnectionReconfiguration message of the RRC layer.

Thereafter, the UE may transmit an acknowledgement message indicating reception of the configuration information, and the message may be transmitted using an RRCConnectionReconfigurationComplete message in step 3d-27. Accordingly, the UE may simultaneously transmit and receive data using both the LTE cell 3d-03, which is the MCG, and the NR cell 3d-05, which is the SCG, in step 3d-29 and step 3d-31.

Figure 3E:
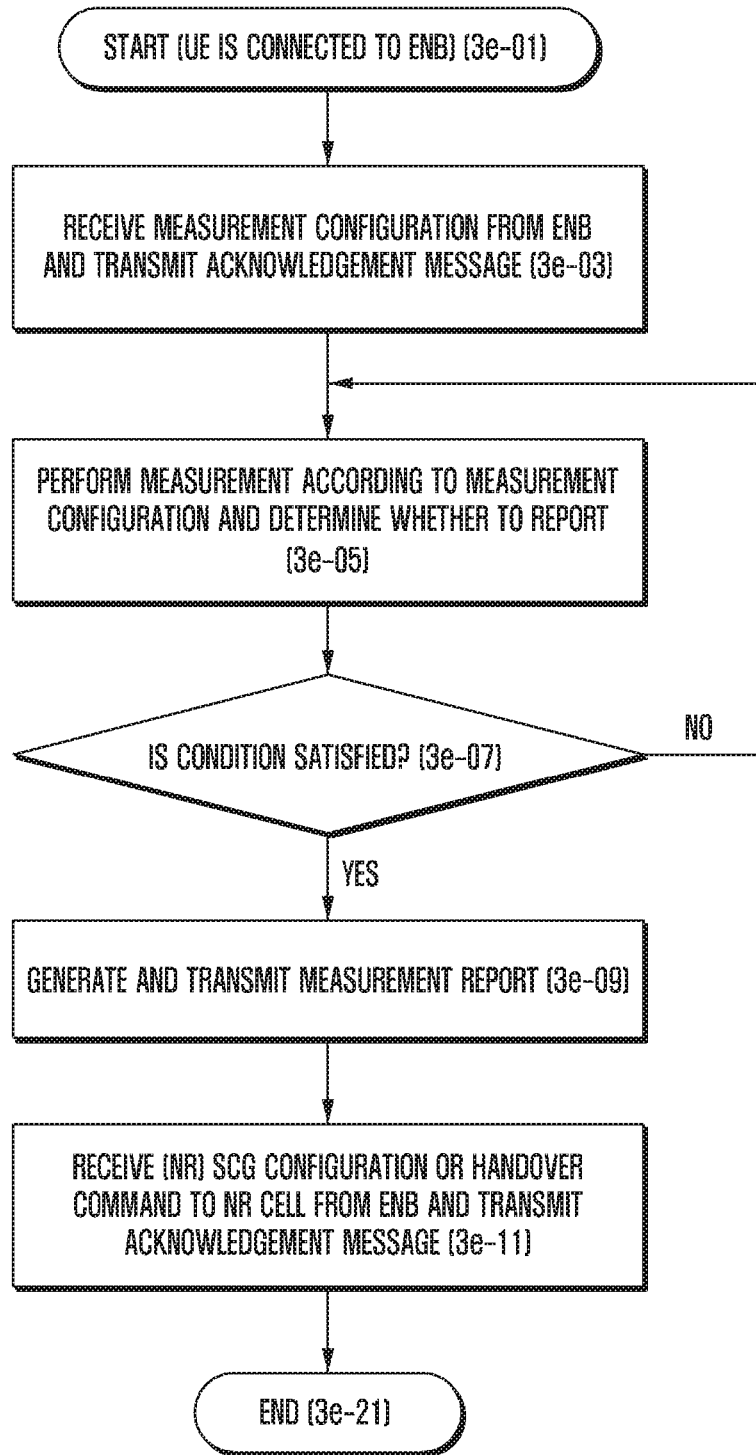
FIG. 3E is a flowchart illustrating the operation of the UE when the present disclosure is applied.

FIG. 3E is a flowchart illustrating the operation of the UE when the present disclosure is applied.

In FIG. 3E, it is assumed that the UE is connected to the LTE eNB and is thus in a connected mode (RRC_CONNECTED) in step 3e-01.

Thereafter, the UE receives a configuration of measurement of neighboring cells from the eNB in step 3e-03. The measurement configuration may include a measurement object (measObject), a report configuration, a measurement start condition, and measurement interval information for other frequency measurement.

The measurement object may include information indicating which frequency will be measured and the frequency information may include an LTE frequency. If the UE supports NR or supports DC with NR, an NR frequency may be included. The configuration information may include a plurality of measurement objects.

The report configuration may include a configuration for periodically reporting the measurement result to the eNB or for reporting the measurement result when the following conditions are satisfied.

Event A1 (the case in which serving cell measurement result is better than threshold value)

Event A2 (the case in which serving cell measurement result is worse than threshold value)

Event A3 (the case in which neighboring cell measurement result is better than primary cell (PCell) (representative cell when the UE uses a plurality of serving cells) measurement result by offset or more)

Event A4 (the case in which neighboring cell measurement result is better than threshold value)

Event A5 (the case in which primary serving cell (PCell) measurement result is worse than threshold value 1 and neighboring cell measurement result is better than threshold value 2)

Event A6 (the case in which neighboring cell measurement result is better than secondary cell (SCell) (remaining cells other than PCell when the UE uses a plurality of serving cells) measurement result by offset or more)

Further, the configuration information may include a plurality of report configurations.

The configuration information may include configuration information for grouping the measurement objects and the report configurations according to the measurement identifier.

The measurement start condition (s-Measure) is one threshold value. When the signal intensity of the PCell, among the serving cells, is higher than the measurement start condition, the UE determines that the signal intensity of the currently accessed cell is good enough and does not measure neighboring cells. By configuring the measurement start condition, the UE does not unnecessarily measure neighboring cells, thereby reducing power consumption of the UE.

Meanwhile, in the state of the EN-DC, even though a channel state of the LTE PCell is good, it may be better not to stop measurement for NR neighboring cells. For example, if the UE uses the LTE PCell and then adds the NR cell to the SCG (that is, NR SCell addition), even though the channel state of the PCell is good, it may be preferable to continuously measure the NR cell to add the NR cell to the NR SCG in time. In another example, if there is an NR cell (providing a better transmission rate) near the UE while the UE uses the LTE PCell, it may be preferable to perform handover to the corresponding NR cell in time when the handover is possible. Accordingly, for the example scenario, the present disclosure includes additional information other than the s-Measure. For the additional information, for example, three schemes may be considered.

Scheme 1: indicator included for each measurement object (measObject)

Measurement is performed in the case of the measurement object including the indicator or when the signal intensity of the PCell is larger than the configured s-Measure.

Scheme 2: second s-Measure (applied only to NR)

When the second s-Measure is configured, the second s-Measure is used for determining whether to measure frequencies belonging to the SCG (for example, NR) or configured by the SCG.

In this case, the second s-Measure is included in the measurement configuration information configured by the NR SCG when EN-DC is configured in the UE.

Scheme 3: indicator included in the measurement configuration information in common.

In this case, the corresponding indicator is commonly applied to frequencies using a predetermined RAT technology (for example, NR).

The UE may receive various measurement configurations through an RRCConnectionReconfiguration message of the RRC layer. Thereafter, the UE transmits an acknowledgement message of the configuration indication, in which case the UE may use an RRCConnectionReconfigurationComplete message of the RRC layer.

The UE receiving the measurement configuration information measures the same frequency as that of the current serving cell (intra-frequency), a different frequency (inter-frequency), and a frequency on which different types of RATs are used (inter-RAT) according to the configured information and determines whether to provide a report in step 3e-05.

At this time, the UE performs the following operation according to each of the schemes.

If the UE receives the configuration of the indicator for each frequency according to scheme 1 and the signal intensity (reference signal received power (RSRP)) of the PCell is smaller than the configured s-Measure value, the UE measures neighboring cells according to configuration information. However, if the RSRP of the PCell is higher than the configured s-Measure value, the UE does not measure a frequency which does not include the indicator, but measures a frequency including the indicator.

If the UE receives the configuration of a second s-Measure value according to scheme 2 and the signal intensity of the PCell is smaller than the existing s-Measure (referred to as a first s-Measure), the UE starts measuring a frequency on which other RATs (for example, LTE, UNITS, and GSM) other than NR are used. When the signal intensity of the PCell is higher than the first s-Measure, the UE does not measure the frequency on which other RATs (for example, LTE, UMTS, and GSM) other than NR are used. Meanwhile, the UE starts measuring NR when the signal intensity of the PCell is smaller than the second s-Measure and does not measure NR when the signal intensity of the PCell is higher than the second s-Measure.

Although another embodiment is not illustrated in FIG. 3E, the second s-Measure value may be configured through the SCG (SgNB). That is, in the state in which the SCG is added to the UE, the measurement information may be directly configured by the SCG, at which time the second s-Measure value may be included. In this case, the UE determines whether to measure a frequency configured to be measured by the MCG using the first s-Measure and determine whether to measure a frequency configured to be measured by the SCG (or a frequency using the same RAT as the RAT used by the SCG) using the second s-Measure value.

If the UE receives the configuration of a predetermined indicator included in common in the measurement configuration information according to scheme 3, the UE measures neighboring cells according to the configuration information when the signal intensity (reference signal received power (RSRP)) of the PCell is smaller than the configured s-Measure value. However, if the RSRP of the PCell is higher than the configured s-Measure value, the UE measures a frequency using a separately indicated or pre-appointed RAT (for example, NR) but does not measure other RAT and LTE frequencies.

According to the rule, the UE measures neighboring cells. When the configured report configuration is satisfied in step 3e-07, the UE generates a measurement report message and transmits the same to the eNB in step 3e-09.

Thereafter, according to the report from the eNB, the UE may receive SCG information and configure the DC function or receive an instruction of handover to the corresponding cell in step 3e-11. The SCG configuration information may include addition and release information of SCells added to the SCG. The SCG configuration information may be transmitted using an RRCConnectionReconfiguration message of the RRC layer.

Thereafter, the UE may transmit an acknowledgement message indicating reception of the configuration information and the message may be transmitted using an RRCConnectionReconfigurationComplete message. Further, in the case of handover, the acknowledgement message may be transmitted to the moved cell. Accordingly, when DC is configured in the UE, the UE may transmit and receive data simultaneously using both the MCG and the SCG.

Figure 3F:
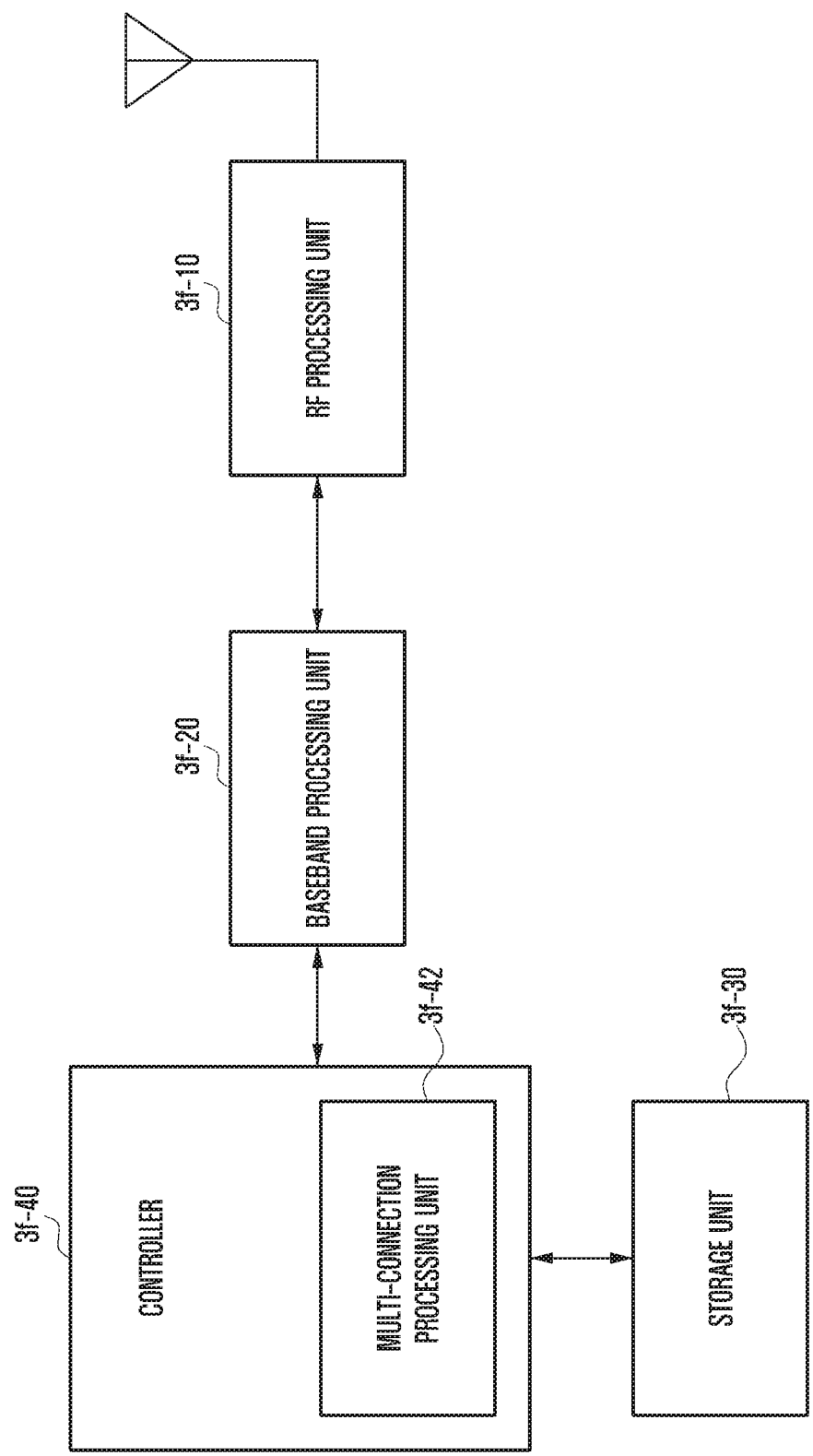
FIG. 3F is a block diagram illustrating the UE according to an embodiment of the present disclosure.

FIG. 3F is a block diagram illustrating the UE according to an embodiment of the present disclosure.

Referring to FIG. 3F, the UE includes a radio-frequency (RF) processing unit 3*f*-10, a baseband processing unit 3*f*-20, a storage unit 3*f*-30, and a controller 3*f*-40.

The RF processing unit 3*f*-10 performs a function for transmitting and receiving a signal through a wireless channel, such as band conversion and amplification of a signal. That is, the RF processing unit 3*f*-10 up-converts a baseband signal provided from the baseband processing unit 3*f*-20 into an RF band signal, transmits the RF band signal through an antenna, and then down-converts the RF band signal received through the antenna into a baseband signal. For example, the RF processing unit 3*f*-10 may include a transmission filter, a reception filter, an amplifier, a mixer, an oscillator, a digital-to-analog convertor (DAC), an analog-to-digital convertor (ADC), and the like. Although only one antenna is illustrated in FIG. 3E, the UE may include a plurality of antennas.

The RF processing unit 3*f*-10 may include a plurality of RF chains. Moreover, the RF processing unit 3*f*-10 may perform beamforming. For the beamforming, the RF processing unit 3*f*-10 may control the phase and size of each signal transmitted/received through a plurality of antennas or antenna elements.

The baseband processing unit 3*f*-20 performs a function of performing conversion between a baseband signal and a bitstream according to the physical layer standard of the system. For example, in data transmission, the baseband processing unit 3*f*-20 generates complex symbols by encoding and modulating a transmission bit string. In data reception, the baseband processing unit 3*f*-20 reconstructs a reception bitstream by demodulating and decoding a baseband signal provided from the RF processing unit 3*f*-10. For example, in an orthogonal-frequency-division-multiplexing (OFDM) scheme, when data is transmitted, the baseband processing unit 3*f*-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion.

Further, in data reception, the baseband processing unit 3*f*-20 divides the baseband signal provided from the RF processing unit 3*f*-20 in units of OFDM symbols, reconstructs the signals mapped to the subcarriers through a fast Fourier transform (FFT) operation, and then reconstructs the reception bitstream through demodulation and decoding.

The baseband processing unit 3*f*-20 and the RF processing unit 3*f*-10 transmit and receive signals as described above. Accordingly, the baseband processing unit 3*f*-20 and the RF processing unit 3*f*-10 may be referred to as a transmitter, a receiver, a transceiver, or a communication unit. Further, at least one of the baseband processing unit 3*f*-20 and the RF processing unit 3*f*-10 may include different communication modules to process signals in different frequency bands. The different frequency bands may include a super-high-frequency (SHF) (for example, 2.5 GHz and 5 GHz) band and a millimeter (mm) wave (for example, 60 GHz) band.

The storage unit 3*f*-30 stores data such as a basic program, an application program, and setting information for the operation of the UE.

The controller 3*f*-40 controls the overall operation of the UE. For example, the controller 3*f*-40 transmits and receives a signal through the baseband processing unit 3*f*-20 and the RF processing unit 3*f*-10. The controller 3*f*-40 records data in the storage unit 3*f*-40 and reads the data. To this end, the controller 3*f*-40 may include at least one processor. For example, the controller 3*f*-40 may include a communication processor (CP), which performs control for communication, and an application processor (AP), which controls a higher layer such as an application program. According to an embodiment of the present disclosure, the controller 3*f*-40 includes a multi-connection processing unit 3*f*-42 for performing processing in a multi-connection mode. For example, the controller 3*f*-40 may control the UE to perform the procedure of the operation of the UE illustrated in FIG. 3E.

According to an embodiment of the present disclosure, the UE receives a message for instructing measurement from the eNB. The controller receiving the message determines whether to start measurement according to the configuration of a measurement event and condition received from the eNB, performs the measurement, and when the measurement is started and the report configuration is satisfied, generates a corresponding measurement result report message and transmits the same to the eNB.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of these may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular or plural expressions are selected to be suitable for proposed situations for convenience of description, and the present disclosure is not limited to the singular or plural elements. An element expressed in a plural form may be configured in singular, or an element expressed in a singular form may be configured in plural.

Meanwhile, while the disclosure has been shown and described with reference to specific embodiments thereof in the detailed description of the present disclosure, it goes without saying that various changes in form and details may be made therein without departing from the spirit and scope of the disclosure. Therefore, the scope of the present disclosure should not be defined as being limited to the embodiments, but should be defined by the appended claims and equivalents thereof.

The invention claimed is:

1. A method by a terminal in a wireless communication system, the method comprising:
   receiving, from a base station, minimum system information (SI) including scheduling information for other SI including at least one resource configuration for requesting at least one other SI which is not being broadcasted;
   identifying a resource configuration corresponding to specific other SI from the at least one resource configuration, based on the scheduling information; and
   transmitting, to the base station, a request for the specific other SI using the identified resource configuration,
   wherein the identified resource configuration is a first resource configuration, in case that the specific other SI is first SI of the at least one other SI, and
   wherein the identified resource configuration is a second resource configuration next to the first resource configuration, in case that the specific other SI is second SI which is a next order of the first SI in the at least one other SI.

2. The method of claim 1, wherein identifying a resource configuration corresponding to specific other SI comprises:
   identifying whether the specific other SI is not being broadcasted based on information included in the scheduling information provided by the minimum SI; and
   identifying the resource configuration corresponding to the specific other SI from the at least one resource configuration, in case that the specific other SI is not being broadcasted.

3. The method of claim 1, wherein the at least one resource configuration includes first information associated with each index of at least one preamble for requesting the at least one other SI, and second information associated with a resource where the at least one preamble is to be transmitted.

4. The method of claim 3, further comprising:
   transmitting, to the base station, a request for all of the at least one other SI, based on one resource configuration included in the minimum SI.

5. A method by a base station in a wireless communication system, the method comprising:
   transmitting, to a terminal, minimum system information (SI) including scheduling information for other SI including at least one resource configuration for requesting at least one other SI which is not being broadcasted; and
   receiving, from the terminal, a request for the specific other SI based on the scheduling information,
   wherein a resource configuration corresponding to the specific other SI is identified from the at least one resource configuration,
   wherein the identified resource configuration is a first resource configuration, in case that the specific other SI is first SI of the at least one other SI, and
   wherein the identified resource configuration is a second resource configuration next to the first resource configuration, in case that the specific other SI is second SI which is a next order of the first SI in the at least one other SI.

6. The method of claim 5, wherein the resource configuration corresponding to the specific other SI is received, in case that the specific other SI is not being broadcasted.

7. The method of claim 5, wherein the at least one resource configuration includes first information associated with each index of at least one preamble for requesting the at least one other SI, and second information associated with a resource where the at least one preamble is to be transmitted.

8. The method of claim 7, further comprising: receiving, from the terminal, a request for all of the at least one other SI, based on one resource configuration included in the minimum SI.

9. A terminal in a wireless communication system, the terminal comprising:
   a transceiver; and
   a controller configured to:
      control the transceiver to receive, from a base station, minimum system information (SI) including scheduling information for other SI including at least one resource configuration for requesting at least one other SI which is not being broadcasted;
      identify a resource configuration corresponding to specific other SI from the at least one resource configuration, based on the scheduling information; and
      control the transceiver to transmit, to the base station, a request for the specific other SI using the identified resource configuration,
   wherein the identified resource configuration is a first resource configuration, in case that the specific other SI is first SI of the at least one other SI, and
   wherein the identified resource configuration is a second resource configuration next to the first resource configuration, in case that the specific other SI is second SI which is a next order of the first SI in the at least one other SI.

10. The terminal of claim 9, wherein the controller is further configured to identify whether the specific other SI is not being broadcasted based on information included in the scheduling information provided by the minimum SI; and identify the resource configuration corresponding to the specific other SI from the at least one resource configuration, in case that the specific other SI is not being broadcasted.

11. The terminal of claim 10, wherein the controller is further configured to control the transceiver to transmit, to the base station, a request for all of the at least one other SI, based on one resource configuration included in the minimum SI.

12. The terminal of claim 9, wherein the at least one resource configuration includes first information associated with each index of at least one preamble for requesting the at least one other SI, and second information associated with a resource where the at least one preamble is to be transmitted.

13. A base station in a wireless communication system, the base station comprising:
   a transceiver; and
   a controller configured to:
      control the transceiver to transmit, to a terminal, minimum system information (SI) including scheduling information for other SI including at least one resource configuration for requesting at least one other SI which is not being broadcasted; and control the transceiver to receive, from the terminal, a request for specific other SI based on the scheduling information, wherein a resource configuration corresponding to the specific other SI is identified from the at least one resource configuration, wherein the identified resource configuration is a first resource configuration, in case that the specific other SI is first SI of the at least one other SI, and wherein the identified resource configuration is a second resource configuration next to the first resource configuration, in case that the specific other SI is second SI which is a next order of the first SI in the at least one other SI.

14. The base station of claim 13, wherein the resource configuration corresponding to the specific other SI is received, in case that the specific other SI is not being broadcasted.

15. The base station of claim 14, wherein the controller is further configured to control the transceiver to receive, from the terminal, a request for all of the at least one other SI, based on one resource configuration included in the minimum SI.

16. The base station of claim 13, wherein the at least one resource configuration includes first information associated with each index of at least one preamble for requesting the at least one other SI, and second information associated with a resource where the at least one preamble is to be transmitted.

* * * * *